US012791389B2

(12) United States Patent
Nakashio et al.

(10) Patent No.: US 12,791,389 B2
(45) Date of Patent: Nov. 10, 2026

(54) INFORMATION PROCESSING APPARATUS AND A METHOD FOR CONTROLLING AN INFORMATION PROCESSING APPARATUS THAT VERIFY COLOR ACCURACY OF A PRINTING APPARATUS

(71) Applicant: CANON KABUSHIKI KAISHA, Tokyo (JP)

(72) Inventors: Hidekazu Nakashio, Saitama (JP); Yukihiro Shindo, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 18/619,077

(22) Filed: Mar. 27, 2024

(65) Prior Publication Data

US 2024/0328859 A1 Oct. 3, 2024

(30) Foreign Application Priority Data

Mar. 29, 2023 (JP) ................................ 2023-054058
Dec. 14, 2023 (JP) ................................ 2023-211516

(51) Int. Cl.
*G01J 3/52* (2006.01)
*H04N 1/60* (2006.01)

(52) U.S. Cl.
CPC .............. *G01J 3/52* (2013.01); *H04N 1/6033* (2013.01)

(58) Field of Classification Search
CPC ............. G01J 3/52; G01J 3/46; H04N 1/6033
USPC .......................................... 358/1.9, 504, 518
See application file for complete search history.

(56) References Cited

U.S. PATENT DOCUMENTS 11,636,294 B2 4/2023 Shindo et al. ......... G06K 15/02
2019/0301941 A1* 10/2019 Kawabata ................ H04N 1/46
2020/0064196 A1 2/2020 Inada ........................ G01J 3/52
2023/0269343 A1* 8/2023 Nakashio ............. H04N 1/6033 358/1.9

FOREIGN PATENT DOCUMENTS

JP 2020-030754 2/2020

OTHER PUBLICATIONS

U.S. Appl. No. 18/592,417, filed Feb. 29, 2024.

* cited by examiner

*Primary Examiner* — Jamares Q Washington
(74) *Attorney, Agent, or Firm* — Venable LLP

(57) ABSTRACT

An information processing apparatus including one or more memory devices that store a set of instructions and one or more processors that execute the set of instructions to decide a colorimetric measurement order of a plurality of charts printed by a printing apparatus, to obtain, from a storage unit according to the decided colorimetric measurement order, a colorimetric measurement condition for each chart for when colorimetrically measuring using a measurement device, the colorimetric measurement condition being registered in advance, to cause the measurement device to sequentially colorimetrically measure the plurality of charts while switching the colorimetric measurement condition for each chart according to the obtained colorimetric measurement condition, and to verify color accuracy of the printing apparatus from a colorimetrically measured value of each one of the plurality of charts.

19 Claims, 20 Drawing Sheets

| INPUT RGB VALUES (PATCH RGB VALUES) | | | |
|---|---|---|---|
| PATCH NUMBER | R | G | B |
| 1 | 0 | 0 | 0 |
| 2 | 0 | 0 | 32 |
| 3 | 0 | 0 | 64 |
| 4 | 0 | 0 | 96 |
| 5 | 0 | 0 | 128 |
| ··· | ··· | ··· | ··· |
| 728 | 255 | 255 | 224 |
| 729 | 255 | 255 | 255 |
| 730 | 255 | 255 | 255 |
| 731 | 255 | 255 | 255 |
| 732 | 255 | 255 | 255 |
| 733 | 255 | 255 | 255 |
| 734 | 255 | 255 | 255 |
| 735 | 255 | 255 | 255 |
| 736 | 255 | 255 | 255 |

| COLOR CHARACTERISTICS | | | |
|---|---|---|---|
| PATCH NUMBER | L* | a* | b* |
| 1 | 16.68 | −0.02 | 0.01 |
| 2 | 17.09 | 2.79 | −4.48 |
| 3 | 17.86 | 4.69 | −10.09 |
| 4 | 18.36 | 6.87 | −15.95 |
| 5 | 18.81 | 9.46 | −21.09 |
| ··· | ··· | ··· | ··· |
| 728 | 91.78 | −1.80 | 10.22 |
| 729 | 92.49 | 0.17 | 1.12 |
| 730 | 92.49 | 0.17 | 1.12 |
| 731 | 92.49 | 0.17 | 1.12 |
| 732 | 92.49 | 0.17 | 1.12 |
| 733 | 92.49 | 0.17 | 1.12 |
| 734 | 92.49 | 0.17 | 1.12 |
| 735 | 92.49 | 0.17 | 1.12 |
| 736 | 92.49 | 0.17 | 1.12 |

INFORMATION PROCESSING APPARATUS AND A METHOD FOR CONTROLLING AN INFORMATION PROCESSING APPARATUS THAT VERIFY COLOR ACCURACY OF A PRINTING APPARATUS

CROSS-REFERENCE TO PRIORITY APPLICATION

This application claims the benefit of Japanese Patent Application No. 2023-054058, filed Mar. 29, 2023, and Japanese Patent Application No. 2023-211516, filed Dec. 14, 2023, each of which is hereby incorporated by reference herein in its entirety.

BACKGROUND OF THE INVENTION

Field of the Invention

The present invention relates to an information processing apparatus that verifies the color accuracy of a printer, and a method for controlling the same.

Description of the Related Art

Typically, in a commercial color printer, to ensure a certain color reproducibility, color management is periodically performed. Color management is performed by comparing a target color set according to an ISO standard, or the like, and the actual color (printed color) actually printed by the printer and checking whether the color accuracy satisfies a pass criterion. In a case when the color accuracy does not satisfy the pass criterion, to enhance the color accuracy, print profile recreation and/or correction processing using the printer color correction function are required. However, these requires time and effort, and, thus, there is a demand to perform these efficiently. In Japanese Patent Laid-Open No. 2020-30754, a technique is disclosed in which verification of the color accuracy of the printer is performed at a plurality of printing time points, and, on the basis of the verification result, the cycle of carrying out the correction task is set and the history of verification results is displayed.

However, the known technique described above has the following problems. For example, when a printed color is obtained in color verification, a chart with a color patch corresponding to the target color is printed by the printer, and the color value of each color patch is measured by a measurement device. Also, in the case of performing a plurality of color verifications, a plurality of charts are printed by the printer, and a plurality of charts are set in the measurement device and measured. At this time, the user needs to register a colorimetric measurement condition suitable for color certification in the color verification system each time and also manually switch the colorimetric measurement condition on the measurement device side to perform colorimetric measurement. In particular, in the case of performing a plurality of color verifications, the task is problematically complicated because different colorimetric measurement conditions need to be set each time for each color certification and print profile condition.

SUMMARY OF THE INVENTION

The present invention enables realization of a mechanism for suitably performing a plurality of color verifications in one measurement job.

One aspect of the present invention provides an information processing apparatus comprising one or more memory devices that store a set of instructions, and one or more processors that execute the set of instructions, for a plurality of charts printed by a printing apparatus, to obtain a colorimetric measurement condition for each chart for when colorimetrically measuring using a measurement device, to cause the measurement device to sequentially colorimetrically measure the plurality of charts while switching the colorimetric measurement condition for each chart according to the obtained information, and to verify color accuracy of the printing apparatus from a colorimetrically measured value of each one of the plurality of charts.

Another aspect of the present invention provides a method of controlling an information processing apparatus, the method comprising, for a plurality of charts printed by a printing apparatus, obtaining a colorimetric measurement condition for each chart for when colorimetrically measuring using a measurement device, performing control to cause the measurement device to sequentially colorimetrically measure the plurality of charts while switching the colorimetric measurement condition for each chart according to information obtained in the obtaining, and verifying color accuracy of the printing apparatus from a colorimetrically measured value of each one of the plurality of charts in the performing control.

Still another aspect of the present invention provides a method of controlling an information processing apparatus, the method comprising, for a plurality of charts printed by a printing apparatus, obtaining a colorimetric measurement condition for each chart for when colorimetrically measuring using a measurement device, performing control to cause the measurement device to sequentially colorimetrically measure the plurality of charts while switching the colorimetric measurement condition for each chart according to the information obtained in obtaining, and registering a target color value for the printing apparatus from a colorimetrically measured value of each one of the plurality of charts in the performing control.

Further features of the present invention will be apparent from the following description of exemplary embodiments with reference to the attached drawings.

DESCRIPTION OF THE EMBODIMENTS

Figure 1:
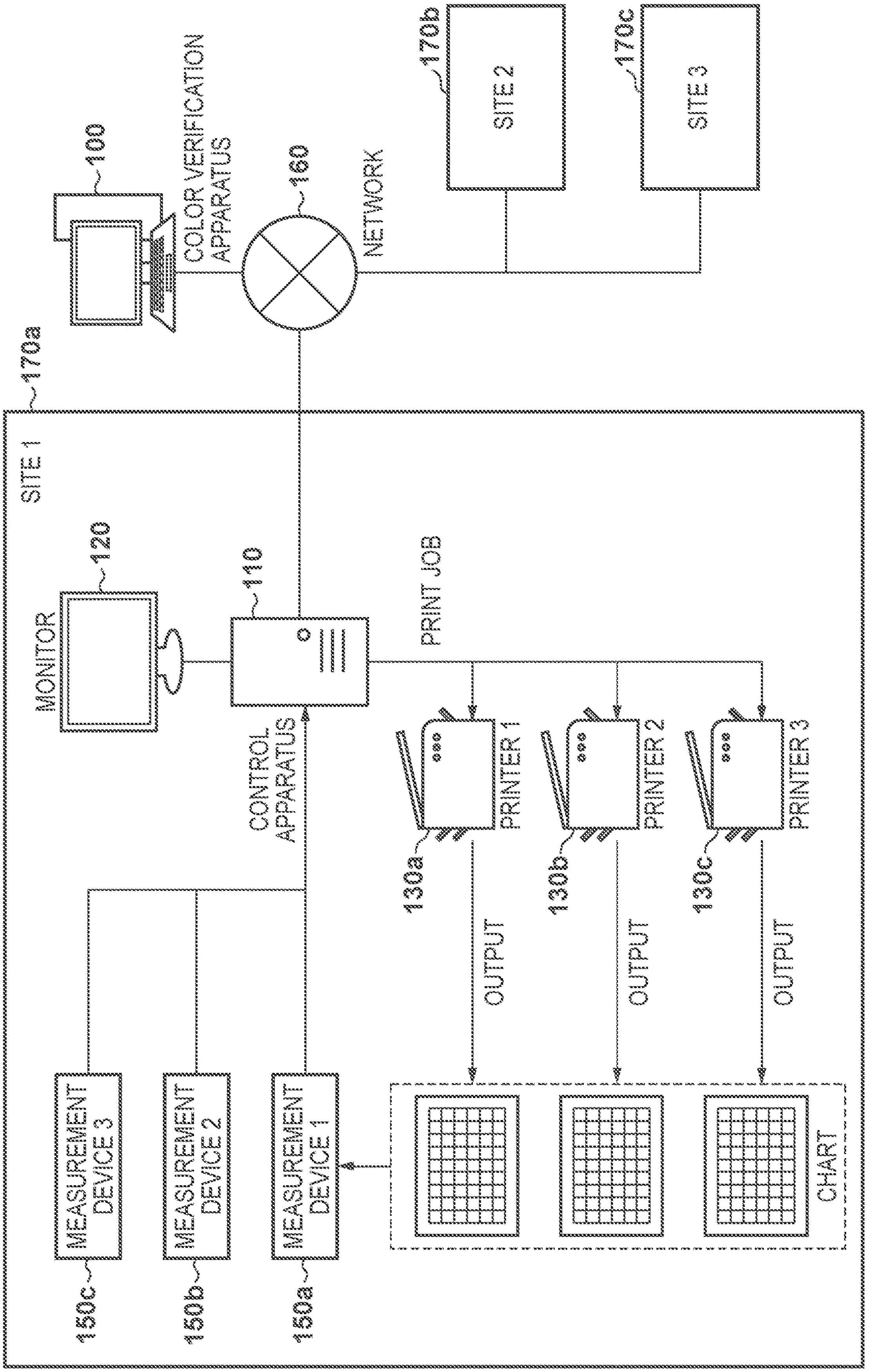
FIG. 1 is a diagram illustrating the overall configuration of a color verification system according to an embodiment.

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

First, an example of the configuration of a color verification system according to the present embodiment will be described with reference to FIG. 1. When color accuracy verification is performed using the present color verification system, first, a predetermined chart is printed out from a verification target printer. Next, a color patch on the printed-out chart is colorimetrically measured by a measurement device, and the obtained colorimetrically measured data is transmitted to a color verification apparatus 100. Then, the color verification apparatus 100 checks the difference (color accuracy) between the printed color and the target color. Note that a color patch on a chart may be referred to as a color chip or color sample, but, in the present specification, it is simply referred to as a "patch".

As illustrated in FIG. 1, in the present color verification system, the color verification apparatus 100 and sites 1 to 3 are connected via a network 160. The site 1 includes a control apparatus 110, a monitor 120, printers 1 to 3 (130*a* to 130*c*), and measurement devices 1 to 3 (150*a* to 150*c*). Also, the sites 2 and 3 each also include a control apparatus, a monitor, a printer, and a measurement device. An example of the relationship between the site 1 and the color verification apparatus 100 will be described below.

The color verification apparatus 100 compares a predefined target color (target color) and an actual color (printed color) actually printed by the printer and verifies whether the color accuracy satisfies a pass criterion. The color verification apparatus 100 and the control apparatus 110 are communicatively connected via the network 160.

The control apparatus 110 is communicatively connected to the printers 130*a* to 130*c* in the site 1 via a communication network such as an intranet, sends printing instructions to each printer, and also centrally manages the color accuracy of each printer. Also, with a printing instruction, a print job can be received from a client terminal (not illustrated), for example, and the print job can be divided on the basis of a predetermined unit (for example, per unit or per page) and distributed among the plurality of printers. A print job includes a page description language (PDL) data portion for describing a draw command for objects of various attributes such as text, graphics, and photos and print settings information for designating print conditions such as paper size and type, double-sided/single-sided printing, and the like. By sending a printing instruction in which one print job is distributed to a plurality of printers, the amount of time required for printing and the printing waiting time can be reduced. The monitor 120 is connected to the control apparatus 110 and displays various types of user interface screens (UI screens).

The printers 1 to 3 (130*a* to 130*c*) use an electrophotographic process technique, for example, and printing a color image on a sheet on the basis of the print job received from the control apparatus 110. A sheet according to the present embodiment includes various types of sheets such as plain paper, cardstock, OHP sheets, and the like. The printers 1 to 3 may be monochrome printers or may be printers based on another image formation technique such as inkjet, or the like. Also, the printers 1 to 3 may be multi-function peripherals with a copy function and a fax function in addition to a print function.

Figures 2A, 2B, 2C:
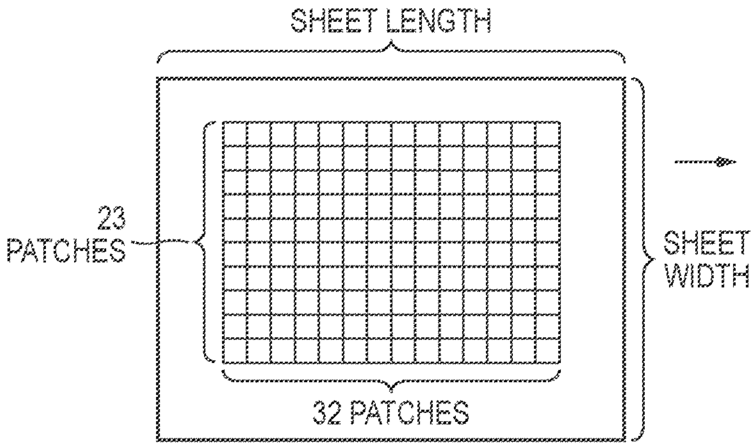
FIGS. 2A to 2C are diagrams illustrating examples of patch signal values and color characteristics of color verification charts according to an embodiment.

The measurement devices 1 to 3 (150*a* to 150*c*) are spectrometers that measure the color values of target objects on the basis of reflectance or transmittance of visible light with a wavelength of approximately 400 nm to 700 nm. The measurement devices 1 to 3 are prepared for each site and convert the wavelengths obtained for each patch of the chart printed out from the printers 1 to 3 to a value in a L*a*b* color space or an XYZ color space, for example, and obtains colorimetrically measured data. FIG. 2A illustrates an example of a chart. FIG. 2B illustrates target color values (RGB values) set in the RGB color space corresponding to each patch (patch numbers 1 to 729) of the chart. The target color values may be converted from RGB to the CMYK color space and stored.

The measurement devices 1 to 3 are measurement device with a built-in line sensor and area sensor for scanning charts. For example, in the case of a sheetfed automatic document reading measurement device, the measurement device can pre-scan the chart before colorimetric measurement via the built-in line sensor and can perform measurement after detecting the position of the patch to be measured. Also, in the case of a measurement device that can perform continuous measurement with automatic feeding, the measurement device can pre-scan the chart via the built-in area sensor and can perform measurement after detecting the position of the patch to be measured in a similar manner. This is also possible with a portable (handy type) measurement device, but, in this case, a configuration is used in which a scanner for scanning charts is separately connected to the control apparatus 110. In the case of a sheetfed automatic document reading measurement device, the measurement device is connected to the control apparatus 110 via USB, or the like, and measures the color value of each patch on the chart printed out from the target printer and obtains colorimetrically measured data such as that illustrated in FIG. 2C. The obtained colorimetrically measured data is transmitted to the color verification apparatus 100 via the control apparatus 110. Also, in a case when the color verification apparatus 100 is installed at one of sites 1 to 3, at the site, the color verification apparatus 100 and the measurement device may be directly connected, and colorimetrically measured data is obtained by the color verification apparatus 100 bypassing the control apparatus 110.

The network 160, for example, may be a local area network (LAN), an Internet, an intranet, or the like, and may be wired or wireless. The sites 1 to 3 (170*a* to 170*c*) correspond to locations in a printing company where printers are installed. For example, the site 1 may be a print site in Tokyo, the site 2 may be a print site in Osaka, and the site 3 may be a print site in Fukuoka. Note that the configuration of the color verification system illustrated in FIG. 1 is an example, and the number of sites and the configuration of the apparatuses in the sites can be changed as appropriate. In another configuration, for example, the color verification apparatus 100 may be directly connected to the control apparatus 110 and the measurement devices 1 to 3 via a communication network such as an intranet, or the like, to manage the color accuracy of the plurality of printers 1 to 3. In yet another configuration, an information processing apparatus provided with the functions of both the color verification apparatus 100 and the control apparatus 110 may be provided at each site to manage the color accuracy of the plurality of printers in the sites.

Information Processing Apparatus Hardware Configuration

Figure 3:
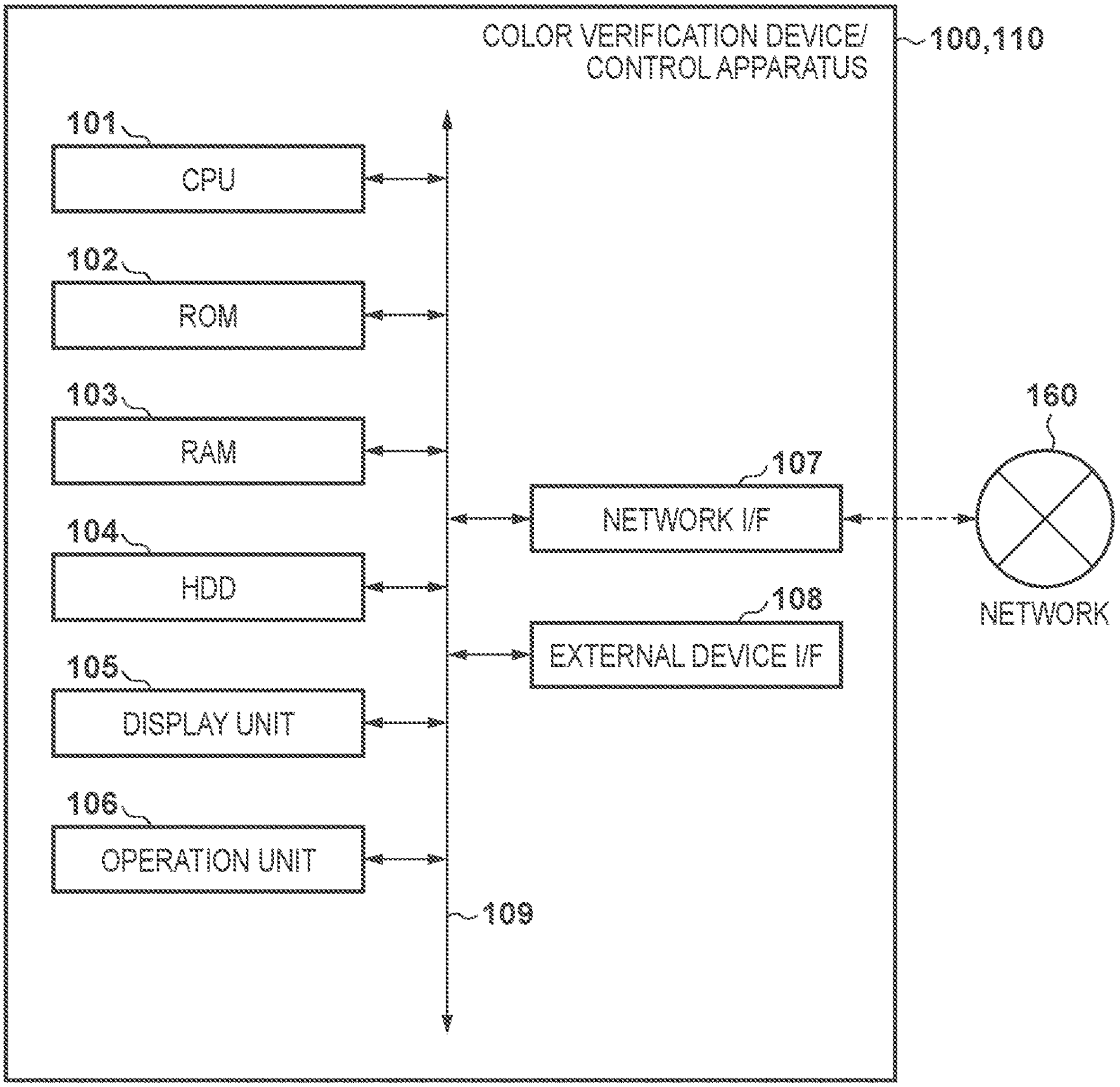
FIG. 3 is a block diagram illustrating the hardware configuration of a color verification apparatus and a control apparatus according to an embodiment.

Next, the hardware configuration of the information processing apparatus according to the present embodiment will be described with reference to FIG. 3. The information processing apparatus according to the present embodiment corresponds to at least one of the color verification apparatus 100 and the control apparatus 110 described above and, for example, is implemented by a general-purpose laptop or desktop personal computer or a tablet terminal. Note that the color verification apparatus 100 and the control apparatus 110 may be provided integrally formed. Accordingly, the color verification apparatus 100 and the control apparatus 110 are examples of the information processing apparatus.

The color verification apparatus 100/control apparatus 110 each includes a CPU 101, ROM 102, RAM 103, an HDD 104, a display unit 105, an operation unit 106, a network I/F 107, and an external device I/F 108. Each unit 101 to 108 is connected to one another via a system bus 109 in a manner allowing for the exchange of data.

The CPU 101 is an operation processing apparatus that controls all of the apparatuses and executes each processing described below on the basis of programs stored in the ROM 102. The ROM 102 is read-only memory and stores boot program, processing programs, character data and character code information, and the like. The RAM 103 is random-access memory and is used as the working memory when the CPU 101 executes the various types of programs. It is also used as a data storage area for image files received from the network I/F 107. The HDD 104 is a storage unit used to store the results of operation processing executed by the CPU 101, various types of programs, various information files, and the like.

The display unit 105 is constituted by a liquid crystal display, for example, and displays a user interface screen for setting various types of settings and checking the state of apparatuses. The operation unit 106 is constituted by a keyboard and buttons, for example, and is used by the user to input various types of setting values, perform a reset, and the like. The network I/F 107 is an interface for apparatuses to connect to the network 160. The color verification apparatus 100 and the control apparatus 110 can each transmit and receive various types of information with an external apparatus via the network I/F 107. The external device I/F 108, for example, is an interface for connecting to an external device such as the measurement devices 1 to 3, or the like, via a communication bus such as a universal serial bus (USB), or the like.

Color Verification Apparatus Software Configuration

Figure 4:
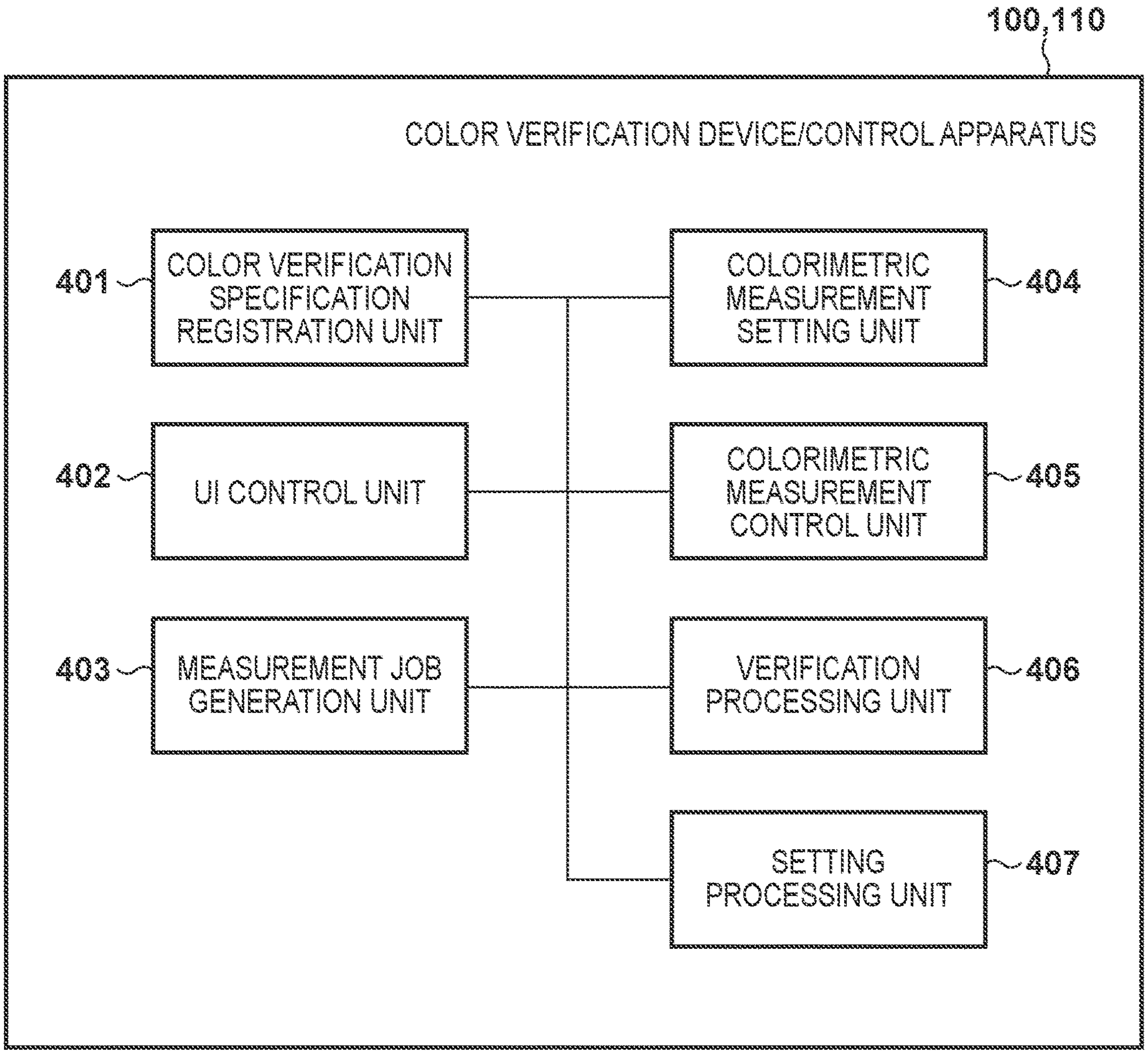
FIG. 4 is a block diagram illustrating the main functional configuration of a color verification apparatus according to an embodiment.

Next, the software configuration of the information processing apparatus (color verification apparatus 100/control apparatus 110) according to the present embodiment will be described with reference to FIG. 4. Here, only the main functional configuration according to the present invention will be described. Thus, other configurations are not excluded.

The color verification apparatus 100/control apparatus 110 includes a color verification specification registration unit 401, a UI control unit 402, a measurement job generation unit 403, a colorimetric measurement setting unit 404, a colorimetric measurement control unit 405, a verification processing unit 406, and a setting processing unit 407. These functional units are implemented by the CPU 101 executing a predetermined program. These functional units will be described below.

The color verification specification registration unit 401 registers charts with patches of various colors corresponding to the target color value, printers to perform color verification, measurement device and colorimetric measurement conditions used in color verification, allowable values when performing color verification, and the like, for each type of color verification. The registration information is stored in the HDD (storage unit) 104 of the color verification apparatus 100 or the control apparatus 110, for example. Specifically, a registration target chart is associated with image data and information (chart configuration information) indicating the configuration of the chart including the number and size of patches in the chart, and the chart is stored in the HDD 104. Charts are largely categorized into specified charts that are compliant to an International Standard Organization standard, or the like, and custom charts that the user defines. Specified charts are pre-registered before the start of usage, such as when the color verification program is installed, for example. Custom charts are registered at any timing on the basis of a user input via the operation unit 106. A printer, from among the printers 130*a*, 130*b*, and 130*c* connected to the control apparatus 110, is registered as a printer to perform color verification. Also, a measurement device, from among the measurement devices 150*a*, 150*b*, and 150*c*, is registered as a measurement device to be used in the color verification. A colorimetric measurement condition set according to Japan Color certification compliant with ISO is registered as a colorimetric measurement condition for when performing color verification. In a similar manner, an allowable value set according to Japan Color certification compliant with ISO is registered as an allowable value for when performing color verification. The allowable value is a value used when comparing the set target color and the actual color (printed color) actually printed by the printer and checking whether the color accuracy satisfies a pass criterion. For example, in the case of determining on the basis of the color value (target value) of the target color and the color value (colorimetrically measured value) of the printed color, the color difference is registered as the allowable value, and, if the color difference is the allowable value or less, it is determined that the color accuracy satisfies the pass criterion. Note that, when color verification is performed, the user selects the color verification specifications from color verification specifications registered by the color verification specification registration unit 401, and color verification is started by the measurement job generation unit 403 generating a measurement job.

The UI control unit 402 controls the display of a user interface screen for the user to check the status of each apparatus in the color verification system, to input and to select various types of setting values, to issue an instruction to start various types of processing, and the like. The displayed user interface screen will be described below.

The measurement job generation unit 403 generates, as a measurement job, a plurality of color verification tests for executing color verification selected by a user from the color verification specifications registered by the color verification specification registration unit 401. Thereafter, a chart is generated on the basis of the chart configuration information corresponding to the selected color verification test. Here, an ID and code image including the colorimetric measurement condition corresponding to the selected color verification test is provided on the chart. Note that there are many plausible formats for the code including a one-dimensional barcode, a two-dimensional QR code (registered trademark), and the like. This will be described below in detail relating to step S504.

The colorimetric measurement setting unit 404 uses a pre-scanned image received from the measurement devices before colorimetrically measuring to read the ID and code image from the image and determine whether or not the chart corresponds to the measurement job. Thereafter, the colorimetric measurement setting unit 404 obtains the colorimetric measurement condition corresponding to the color verification test and sets the colorimetric measurement condition of the measurement device to colorimetrically measure the chart. This will be described below in detail relating to step S513.

The colorimetric measurement control unit 405 controls performing the pre-scan before colorimetrically measuring the chart and controls performing colorimetrically measuring the chart. The verification processing unit 406 uses the colorimetrically measured data received from the measurement device 150*a* and executes processing to verify whether or not the color accuracy of the target printer satisfies the pass criterion. The setting processing unit 407 sets the various types of parameters relating to the verification processing on the basis of user selection received via a predetermined user interface screen or the like.

Overall System Processing Sequence

Next, a processing sequence executed when performing color verification using the color verification system according to the present embodiment will be described with reference to FIGS. 5A and 5B. In the processing sequence described below, it is assumed that a plurality of color verifications are performed on the printers 130*a* and 130*b* by using the measurement device 150*a* to output a plurality of charts. Also, in the example described below, the various types of operation screens are displayed on the display unit 105 of the color verification apparatus 100. However, no such limitation is intended, and the operation screens may be displayed on the display unit 105 of the control apparatus 110 or another display unit. Note that hereafter, "S" denotes the term "step".

Figure 6A:
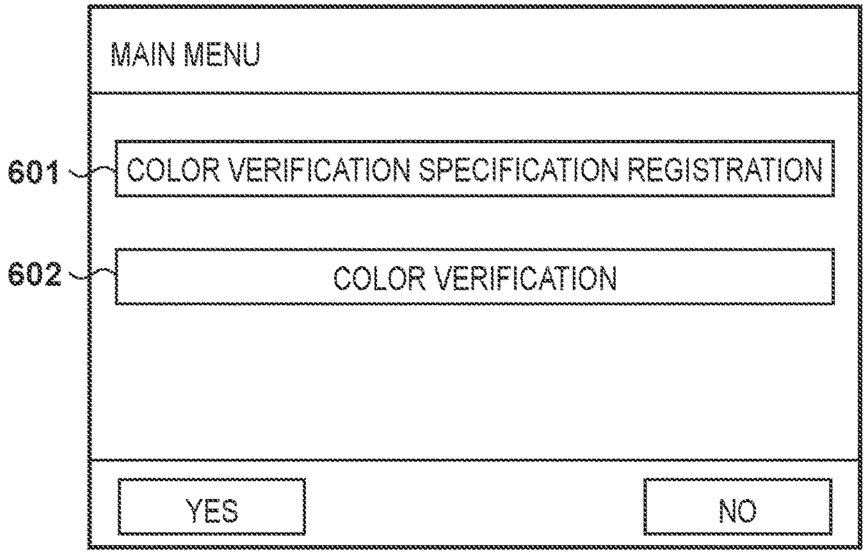
FIGS. 6A to 6F are diagrams illustrating examples of a display unit 105 according to an embodiment.

First, in S501, the color verification specification registration unit 401 starts color verification specifications registration on the basis of a user input. When the user that wishes to register a color verification specification selects a color verification specification registration button 601 on the main menu screen illustrated in FIG. 6A, the screen transitions to the color verification specification registration screen illustrated in FIG. 6B. Note that control of these UI screens is performed by the UI control unit 402.

Figure 6B:
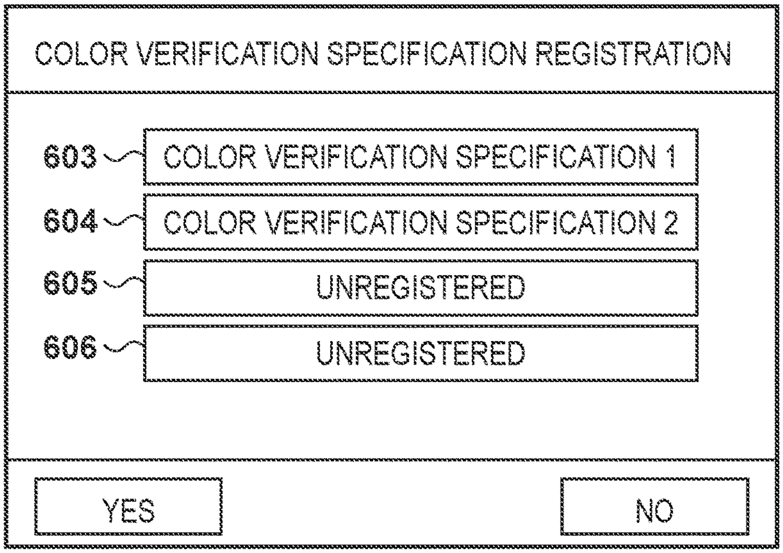
Figure 6C:
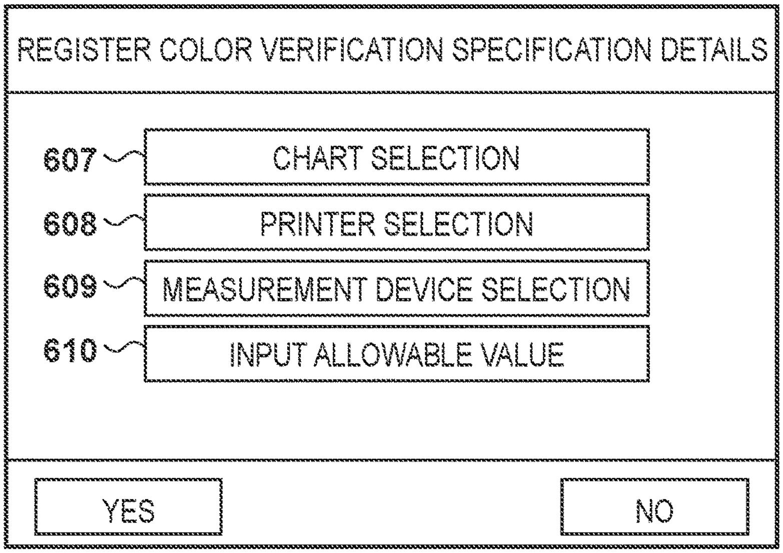

With display regions 603 to 606 of the color verification specification registration screen in FIG. 6B, when a color verification specification for registering/editing is selected, the screen transitions to the detailed selection screen of the color verification specification in FIG. 6C. The display regions 603 and 604 indicate a registered color verification specification, and the display regions 605 and 606 indicate unregistered. When a registered color verification specification is selected, editing can be performed, and when an unregistered item is selected, a new color verification specification can be registered. The detailed selection screen of the color verification specification in FIG. 6C includes display regions 607 to 610 where settings relating to each color verification specification can be set.

Figure 6D:
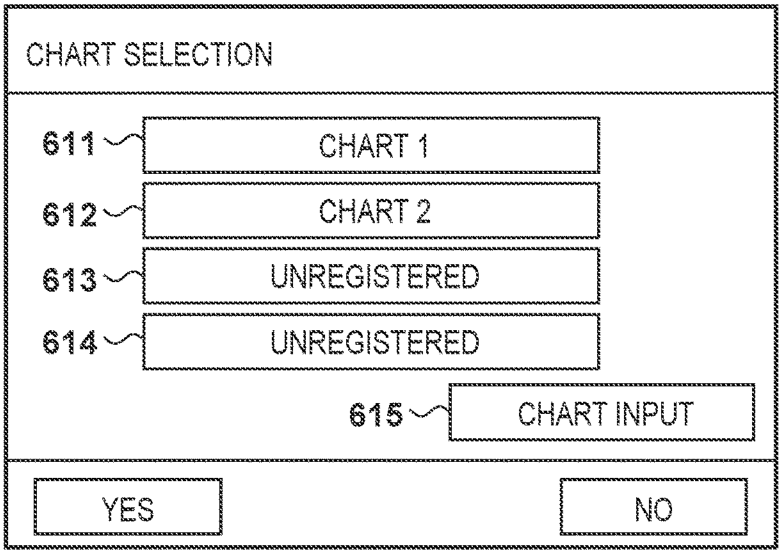

At the detailed selection screen of the color verification specification in FIG. 6C, when "select chart" of the display region 607 is selected, the screen transitions to the chart selection screen illustrated in FIG. 6D. The user selects a chart to use in color verification from display regions 611 to 614 of the chart selection screen illustrated in FIG. 6D. "Chart 1" and "Chart 2" of the display regions 611 and 612 of the chart selection screen in FIG. 6D are pre-registered specified charts set according to the ISO standard or the like. When the user selects an input chart button 615, the user can input the various types of information needed to register a custom chart. Specifically, a name, patch number, patch size, and paper size/type relating to the custom chart to be registered are input and image data is uploaded to complete registration. A chart image is generated using a file format such as TIFF, PDF, JPEG, or the like. In this manner, a chart can be registered in the "unregistered" of the display regions 613 and 614 of the chart selection screen in FIG. 6D. Note that a list of registered charts and chart configuration information of each chart are collectively referred to as "chart information".

Next, in S502, the color verification specification registration unit 401 obtains, from the control apparatus 110, a list of the printers 1 to 3 managed by the control apparatus 110 and information (hereinafter, referred to as "printer status information") indicating the status of each printer. Here, for example, the printer status information includes information such as power supply state (on/off), presence of fault, and print job processing status (printing in progress/on standby). The printer status information is obtained by the control apparatus 110 periodically accessing the printers 1 to 3 and storing it. Note that, hereafter, the list of printers and the printer status information of each printer are collectively referred to as "printer information".

Next, the color verification specification registration unit 401 accepts a selection of "select printer" of the display region 608 of the detailed selection screen illustrated in FIG. 6C. When "select printer" is received, the UI control unit 402 transitions the screen to the printer selection screen illustrated in FIG. 6E and executes processing to accept the selection of the printer (hereinafter, referred to as "target printer") targeted for color verification. Specifically, a user selection is received via the UI screen displayed on the display unit 105 via the UI control unit 402, and the setting processing unit 407 sets the printer (in this example, the printer 1) associated with the selection as the target printer.

Figure 6E:
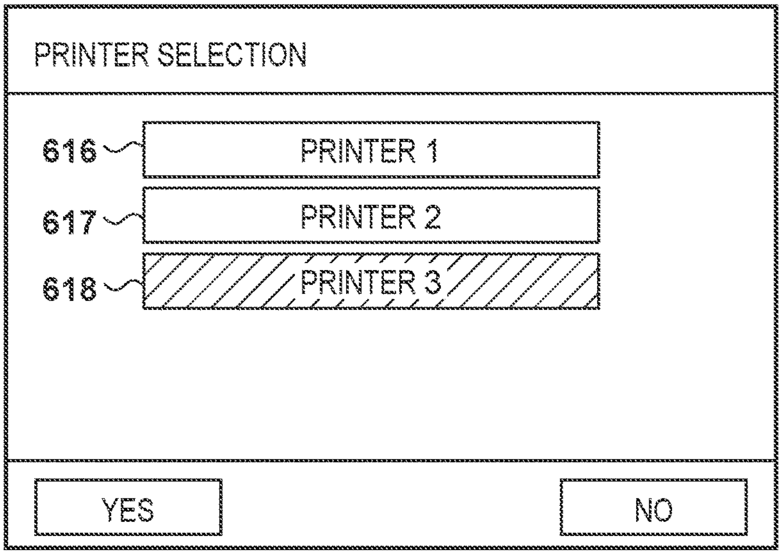

FIG. 6E illustrates a printer selection screen for when the user selects the target printer. In display regions 616 to 618 of the printer selection screen, a list of printers (in this example, the printers 1 to 3) that may be targeted for processing is displayed according to the printer information obtained in S502. At this time, on the basis of the printer status information, processing may be executed to gray out printers in a state in which the printer cannot print to make it easier to see which printers are in a state in which the printer can print and which are in a state in which the printer cannot print. In the printer selection screen in FIG. 6E, only the printer 3 is grayed out, indicating that the printer 3 is in a state in which it can print.

Next, the color verification specification registration unit 401 obtains, from the control apparatus 110, a list of the measurement devices 1 to 3 managed by the control apparatus 110 and specification information of each measurement device and information (hereafter, referred to as "measurement device status information") indicating the status of each measurement device. Here, specification information is information indicating the specifications of each measurement device including the supported paper size and minimum patch size and the minimum/maximum patch number per 1 sheet (1 page). Also, for a measurement device with an accessory, the specification information may include the specification difference due to having or not having the accessory. Here, an accessory refers to a measurement ruler, an automatic feeding unit, or the like. A measurement ruler is an apparatus the assists a slide operation when measuring by enabling stable colorimetric measurement to be performed by a handy type measurement device. A sensor installed on the back surface of the measurement device can detect the direction the user is measuring (measurement from left to right, measurement from right to left, or the like) by detecting the stripe pattern of the measurement ruler. An automatic feeding unit is an apparatus the enables continuous colorimetric measurement by automatically feeding charts printed out from the printer into the measurement device. The measurement device status information, for example, include information such as power supply state (on/off) and connection status. The specification information and the measurement device status information are obtained by the control apparatus 110 beforehand or periodically accessing the measurement devices 1 to 3 and storing them. Note that the list of measurement devices and the specification information and measurement device status information of each measurement device are collectively referred to as "measurement device information".

Figure 6F:
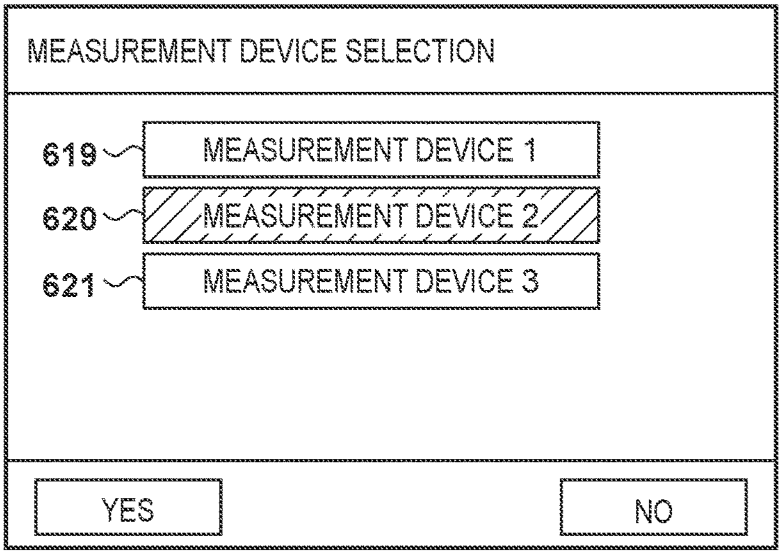

Next, the color verification specification registration unit 401 accepts a selection of "select measurement device" of the display region 609 of the detailed selection screen illustrated in FIG. 6C. When "select measurement device" is received, the UI control unit 402 transitions the screen to the measurement device selection screen illustrated in FIG. 6F and executes processing to accept the selection of the measurement device to be used to measure the color values of a chart. Specifically, a user selection is received via the UI screen displayed on the display unit 105 via the UI control unit 402, and the setting processing unit 407 sets the measurement device associated with the selection as the measurement device to be used in chart measurement. FIG. 6F illustrates a measurement device selection screen for when the user selects the measurement device. In display regions 619 to 621 of the measurement device selection screen, a list of measurement devices (in this example, the measurement devices 1 to 3) that may be targeted for processing is displayed according to the measurement device information obtained in S504. At this time, on the basis of the measurement device status information, processing may be executed to gray out measurement devices in an unusable state to make it easier to see which are in a usable state and which are in an unusable state. In the measurement device selection screen in FIG. 6F, only the measurement device 2 is grayed out, indicating that the measurement device 2 is in an unusable state.

Figure 6G:
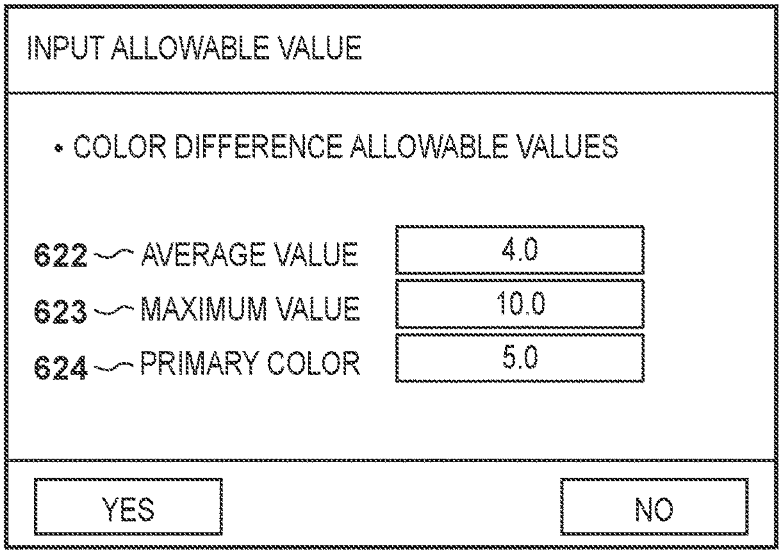
FIGS. 6G to 6N are diagrams illustrating examples of the display unit 105 according to an embodiment.
Figure 6H:
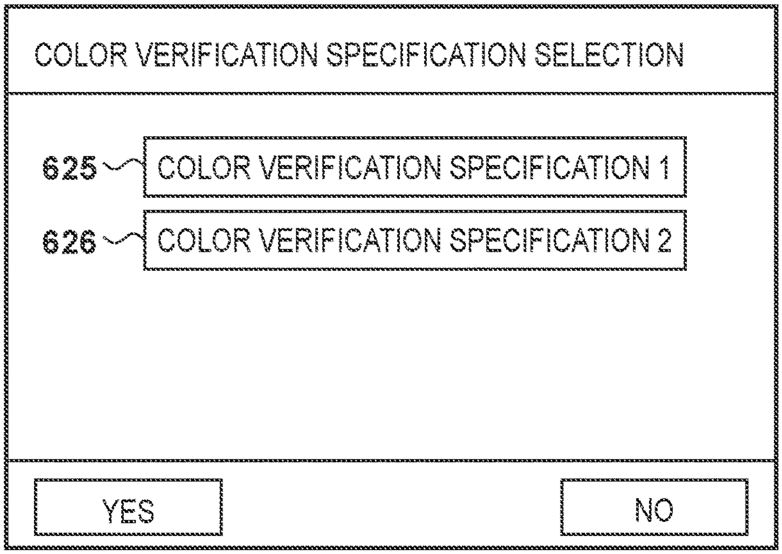
Figure 6I:
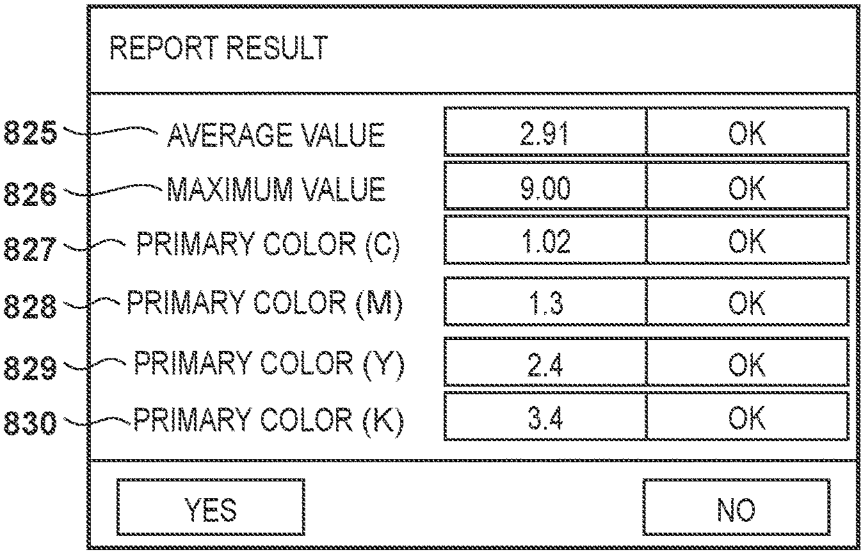
Figure 6J:
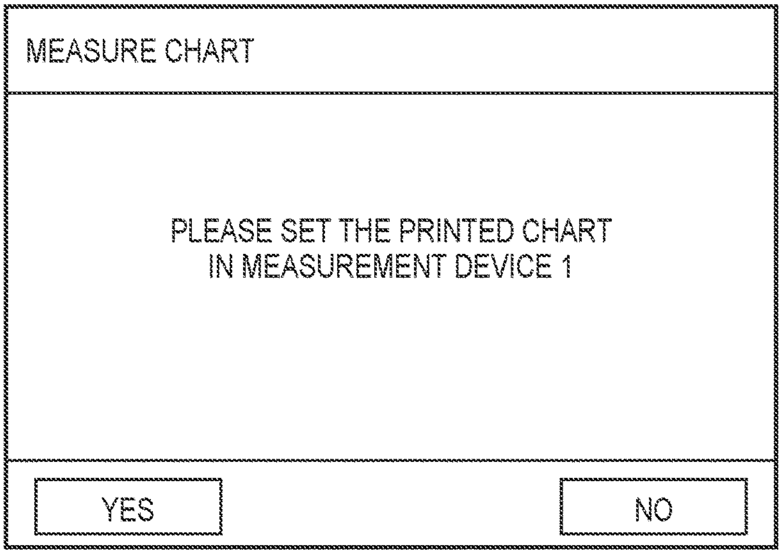
Figure 6K:
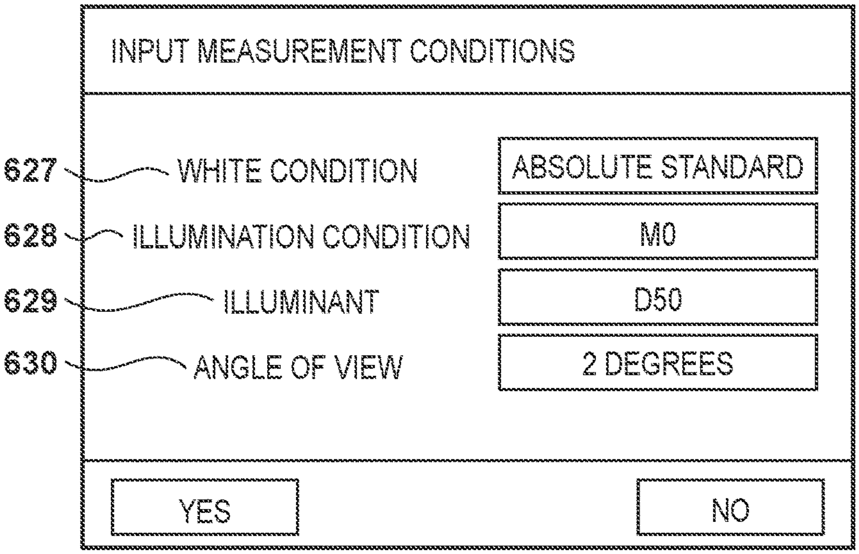

Next, the screen transitions to the colorimetric measurement condition input screen illustrated in FIG. 6K, and processing to executed to receive a colorimetric measurement condition for colorimetrically measuring. Specifically, a user selection is received via the UI screen displayed on the display unit 105 via the UI control unit 402, and the setting processing unit 407 sets the colorimetric measurement condition associated with the selection. FIG. 6K illustrates a colorimetric measurement condition input screen for when the user inputs various types of colorimetric measurement conditions. The colorimetric measurement conditions include at least one of whiteness condition 627, illumination condition 628, illuminant 629, and angle of view 630. However, no such limitation is intended. The whiteness condition 627 is selected from a "blank sheet whiteness standard" that uses the white background of printing paper as the standard and an "absolute whiteness standard" that uses a whiteness standard print "white tile" of the measurement device as the standard. The illumination condition 628 is selected from the displayed "M0", "M1", "M2", and "M3" standardized in ISO 13655. The illuminant (observation light source) 629 is selected from types of light source data incorporated when calculating L*a*b. Examples of the types include "A", "D50", "D65", and the like. The angle of view 630 relates to the angle of view (size of object) when a person views an object and is selected from the ISO standardized "2-degree field of view" "10-degree field of view", or the like.

Note that, in a case when color verification is performed according to Japan Color certification or Fogra certification based on an ISO international standard, the colorimetric measurement condition is predetermined according to the type of color certification. Thus, a configuration may be used in which the user only needs to register the type of color certification, and the colorimetric measurement condition is automatically registered in the color verification specification registration unit 401 according to the type of color certification. In this case, the colorimetric measurement conditions corresponding to the color certification is prestored in a table such as Table 1, and the colorimetric measurement condition corresponding to the type of color certification is registered by referencing the table. Note that a configuration may be used in which a user or administrator performing color verification can register or delete a user-defined colorimetric measurement condition. For example, the administrator may add "Custom: Profile A" and the described color certifications listed in Table 1 to the table in advance. Thereafter, the user performing color verification may select "Custom: Profile A" to automatically register the colorimetric measurement condition in the color verification specification registration unit 401. Note that, in the present embodiment, the usable colorimetric measurement conditions are different depending on the measurement device. Thus, after the measurement device is selected, the colorimetric measurement condition is registered. However, in another configuration, a "select colorimetric measurement condition" menu is provided on the screen of FIG. 6C and the measurement device and the colorimetric measurement condition are each registered.

TABLE 1

| Color Verification | JapanColor2011 Lab certified (digital printing certification) | JapanColor2011 Density certified | Fogra 51 PSD | Custom: Profile A |
|---|---|---|---|---|
| Status | — | Status T | — | — |
| Whiteness condition | Absolute whiteness standard | Absolute whiteness standard | Absolute whiteness standard | Pure-whiteness standard |
| Illumination condition | M0 | M0 | M1 | M0 |
| Illuminant (observation light source) | D50 | — | D50 | D50 |
| Angle of view | 2 degrees | — | 2 degrees | 2 degrees |
| Geometrical condition | 0/45 or 45/0 | 0/45 or 45/0 | 0/45 or 45/0 | Integrating sphere |

Next, the color verification specification registration unit 401 accepts a selection of "input allowable value" of the display region 610 of the detailed selection screen illustrated in FIG. 6C. When a selection of "input allowable value" is received, the UI control unit 402 transitions the screen to the allowable value input screen illustrated in FIG. 6G and executes processing to accept the data including the target color values of each patch in the used chart, allowable values for the verification items, and the like. Specifically, a user selection is received via the UI screen displayed on the display unit 105 via the UI control unit 402, and the setting processing unit 407 sets the target color values and allowable values for the verification items associated with the selection. FIG. 6G illustrates an allowable value input screen for when the user inputs an allowable value for a verification item. For verification items, for example, the average value of color difference ΔE for each patch, the maximum value of the color difference ΔE, the color difference ΔE of primary colors (CMYK), and the like, may be used, and the allowable values are set in accordance with each verification item. The user may preset the allowable values in accordance with the verification items via such a UI screen. Here, the color difference ΔE is the linear distance between the target color value and the color value (colorimetrically measured value) indicated by the colorimetrically measured data in the L*a*b* color space and can be obtained using the following Formula (1), for example.

Math. 1

$$\Delta E = \sqrt{\Delta L^2 + \Delta La^2 + \Delta b^2} \tag{1}$$

$$\Delta L = L_1 - L_2$$

$$\Delta a = a_1 - a_2$$

$$\Delta b = b_1 - b_2$$

Here, it is assumed that a color difference allowable value is set for each verification item such as those illustrated on the color verification settings screen in FIG. 6G. In this case, is the average value of the color difference ΔE of each patch is within ±4.0, the maximum value of the color difference ΔE is within ±10.0, and the color difference ΔE of primary colors (CMYK) (ΔE_primary colors) is within ±5.0, a pass (OK) is determined. On the other hand, if any of the values exceed the allowable value of a verification item, a fail (NG) is determined.

Note that, as with the colorimetric measurement condition, in a case when color verification is performed according to Japan Color certification or Fogra certification based on an ISO international standard, the allowable values are determined according to the type of color certification. Thus, a configuration may be used in which the user only needs to register the type of color certification, and the allowable values are automatically registered in the color verification specification registration unit 401 according to the type of color certification. In this case, the allowable values corresponding to the color certification are pre-stored in a table such as Table 2, and the allowable values corresponding to the type of color certification are registered by referencing the table.

TABLE 2

| Color Verification | JapanColor2011 Lab certified (digital certification) | Fogra 51 PSD | ISO 12647-7 Proof Printing |
|---|---|---|---|
| Average ΔE00 | 2 or less | Less than 2.5 | 2.5 or less |
| Maximum ΔE00 | 6 or less | — | 5.0 or less |
| Spot ΔE00 | — | Less than 2.5 | 3.0 or less |
| 95% ΔE00 | 4 or less | Less than 4.5 | 5.0 or less |

Next, in S503, the measurement job generation unit 403 starts color verification on the basis of a user input. When the user that wishes to start color verification selects a color verification button 602 on the main menu screen illustrated in FIG. 6A, the screen transitions to the color verification specification selection screen illustrated in FIG. 6H. Note that control of these UI screens is performed by the UI control unit 402.

In S504, when "Color verification specification 1" and "Color verification specification 2" of display regions 625 and 626 of the color verification specification selection screen in FIG. 6H are operated, the measurement job generation unit 403 executes processing to generate a measurement job corresponding to each color verification specification. Note that, by simultaneously selecting a plurality of color verification specifications, a plurality of measurement jobs can be generated. When a measurement job is generated, the color verification target printer, the measurement device to be used, the colorimetric measurement conditions, and a chart and allowable values used in color verification registered in the process from S501 to S503 are uniquely set.

Figure 9A:
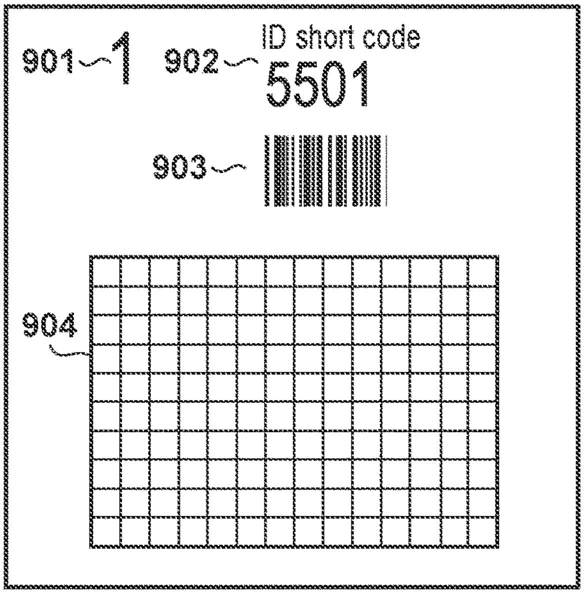
FIGS. 9A to 9D are diagrams for describing examples of color verification charts according to an embodiment.

Also, the measurement job generation unit 403 provides the image data of the chart with an ID including the colorimetric measurement conditions and a code image. The chart illustrated in FIG. 9A is a chart provided with an ID including the colorimetric measurement conditions and a code image. Here, 901 denotes the page number of the chart, and in a case when the chart to be used in color verification is constituted by a plurality of pages, the number of 901 counts up. Here, 902 denotes a display ID of an ID (hereafter, referred to as a measurement job ID) corresponding each measurement job, and each measurement job is provided with the associated ID and code image. By checking the display ID, the user can see which chart is associated with the measurement job.

Here, 903 denotes an example of an ID and code image including colorimetric measurement conditions. This is used in the colorimetric measurement condition setting processing of S513 described below when the colorimetric measurement condition corresponding to the measurement job is automatically set in the measurement device. Note that 903 is an example of a one-dimensional barcode code image. A one-dimensional barcode format example is indicated in Table 3. In a one-dimensional barcode, the chart layout information is in the 1st to 8th digits. In the case of the numbers RRCCXXYY, RR represent the chart row numbers, CC represent the chart column numbers, XX represent the patch size in the horizontal direction, and YY represent the patch size in the vertical direction. The 9th digit number represents the page number of the chart. The 10th digit is blank. The 11th to 46th digit numbers represent the number associated with the measurement job ID, that is, identification information for identifying the measurement job. The 48th to 51st digits are assigned to values indicating the colorimetric measurement condition, with the 48th digit being assigned to the whiteness condition, the 49th digit being assigned to the illumination condition, the 50th digit being assigned to the illuminant (observation condition), and the 51st digit being assigned to a number corresponding to the angle of view. The 52nd to 55th digit numbers are a checksum and are used for differentiating barcodes from one another, preventing falsification, and the like. Note that regular expressions of the numbers corresponding to the digits are indicated in Table 3. Also, in this example, they are embedded in one code image, but no such limitation is intended, and they may be embedded in a plurality of code images according to the amount of information.

TABLE 3

| Digits | Contents | Format (regular expression) |
|---|---|---|
| 1-8 | Chart layout information | [0-9A-F] |
| 9 | Page number | [0-9] |
| 10 | Blank | Blank |
| 11-46 | Measurement job ID number | [0-9A-F]{8}¥-[0-9A-F]{4}¥-[0-9A-F]{4}¥-[0-9A-F]{4}¥-[0-9A-F]{12} |
| 47 | Blank | ¥* |
| 48-51 | Colorimetric measurement condition number<br>Whiteness condition<br>Illumination condition<br>Illuminant<br>Angle of view | [0-9]{1}¥-[0-9]{1}¥-[0-9]{1}¥-[0-9]{1} |
| 52-55 | Checksum | ¥d{4} |

Note that color verification may be performed by printing batches of charts for one measurement job. This is for cases when color verification is wished to be performed with stable density after the printing of a plurality of batches due to density tending to fluctuate at the start of printing with a printer. Consider an example in which the same chart is printed in three batches and color verification is wished to be performed using the second printed product and not the first and last printed product. In this case, since the charts are provided with the same measurement job ID, it can be difficult to discern in what order the chart was printed via the measurement job ID listed in Table 3. Here, as listed in Table 4, by providing measurement job IDs with different embedded batch number information (9th digit), what order the chart was printed can be discerned. By using the measurement job ID of Table 4, only the colorimetrically measured value of the second chart can be transmitted to the color verification apparatus 100.

TABLE 4

| Digits | Contents | Format (regular expression) |
|---|---|---|
| 1-8 | Chart layout information | [0-9A-F] |
| 9 | Batch number | [0-9] |
| 10 | Page number | [0-9] |
| 11 | Blank | Blank |
| 12-47 | Measurement job ID number | [0-9A-F]{8}¥-[0-9A-F]{4}¥-[0-9A-F]{4}¥-[0-9A-F]{4}¥-[0-9A-F]{12} |
| 48 | Blank | ¥* |
| 49-52 | Colorimetric measurement condition number<br>Whiteness condition<br>Illumination condition<br>Illuminant<br>Angle of view | [0-9]{1}¥-[0-9]{1}¥-[0-9]{1}¥-[0-9]{1} |
| 53-56 | Checksum | ¥d{4} |

Here, 904 denotes a color patch on the chart. By colorimetrically measuring the color patch 904 with the measurement device according to the colorimetric measurement condition, color verification of the printer that printed the chart is performed.

Figure 9B:
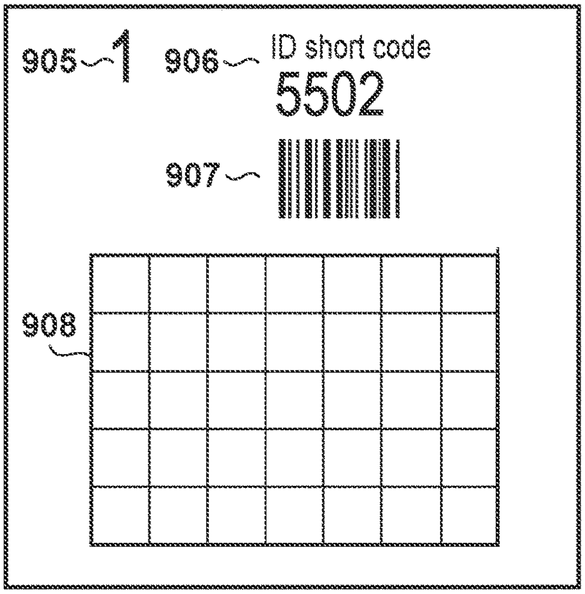

The plurality of charts to be used when performing a plurality of color verifications are charts provided with different IDs for each measurement job, as illustrated in FIGS. 9A and 9B. Here, 902 and 906 are the display IDs of measurement jobs, and since ID codes associated with the measurement jobs are provided, 902 and 906 are provided with different display IDs. By looking at the display IDs, the user can see whether the output chart is from the printer 1 or the printer 2. In a similar manner, 903 and 907 are code images including the colorimetric measurement conditions. Since an ID and code image associated with the measurement jobs are provided, 903 and 907 are each provided with a code (code image) including the colorimetric measurement condition corresponding to the measurement job. Here, 904 and 908 are color patches and are constituted by patches based on different signal values.

Figure 9C:
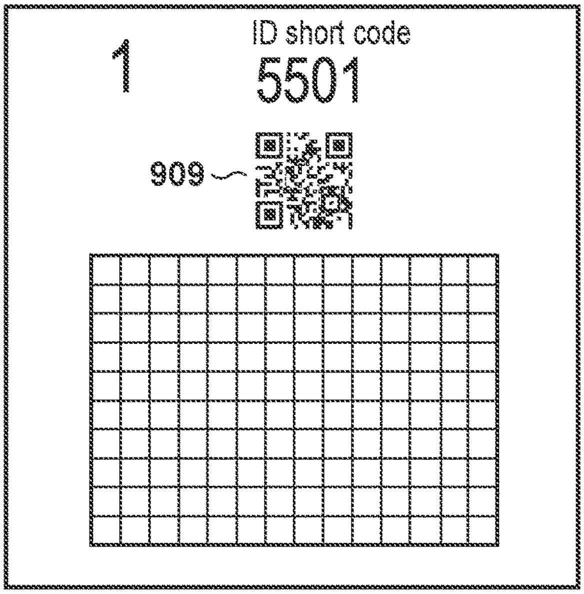

As with 903, 909 in FIG. 9C is a code including the colorimetric measurement condition used in the colorimetric measurement condition setting processing of S513 described below. In this example, the code is a QR code. Note that a configuration may be used in which whether to provide the chart with a barcode or a QR code is switched via a sensor of the measurement device. In other words, if the built-in sensor of the measurement device used for when prescanning the chart is a line sensor (linear sensor) with elements arranged in a horizontal row, since only barcodes can be read, a barcode is provided to the chart. On the other hand, in a case when the measurement device is provided with an area sensor with elements arranged in a vertical and horizontal two-dimensional arrangement, a QR code is provided that enables more information to be embedded. In this example, a QR code is used as an example of a two-dimensional code, but, naturally, other two-dimensional codes may be used. Also, in this example, one QR code is embedded. However, depending on the amount of information to embed, a plurality of code images may be embedded. A chart provided with a code image including the colorimetric measurement conditions is provided to the target printer. According to the present embodiment, first, the image data of the determined chart is transmitted to the control apparatus 110 via the network I/F 107.

Figure 5A:
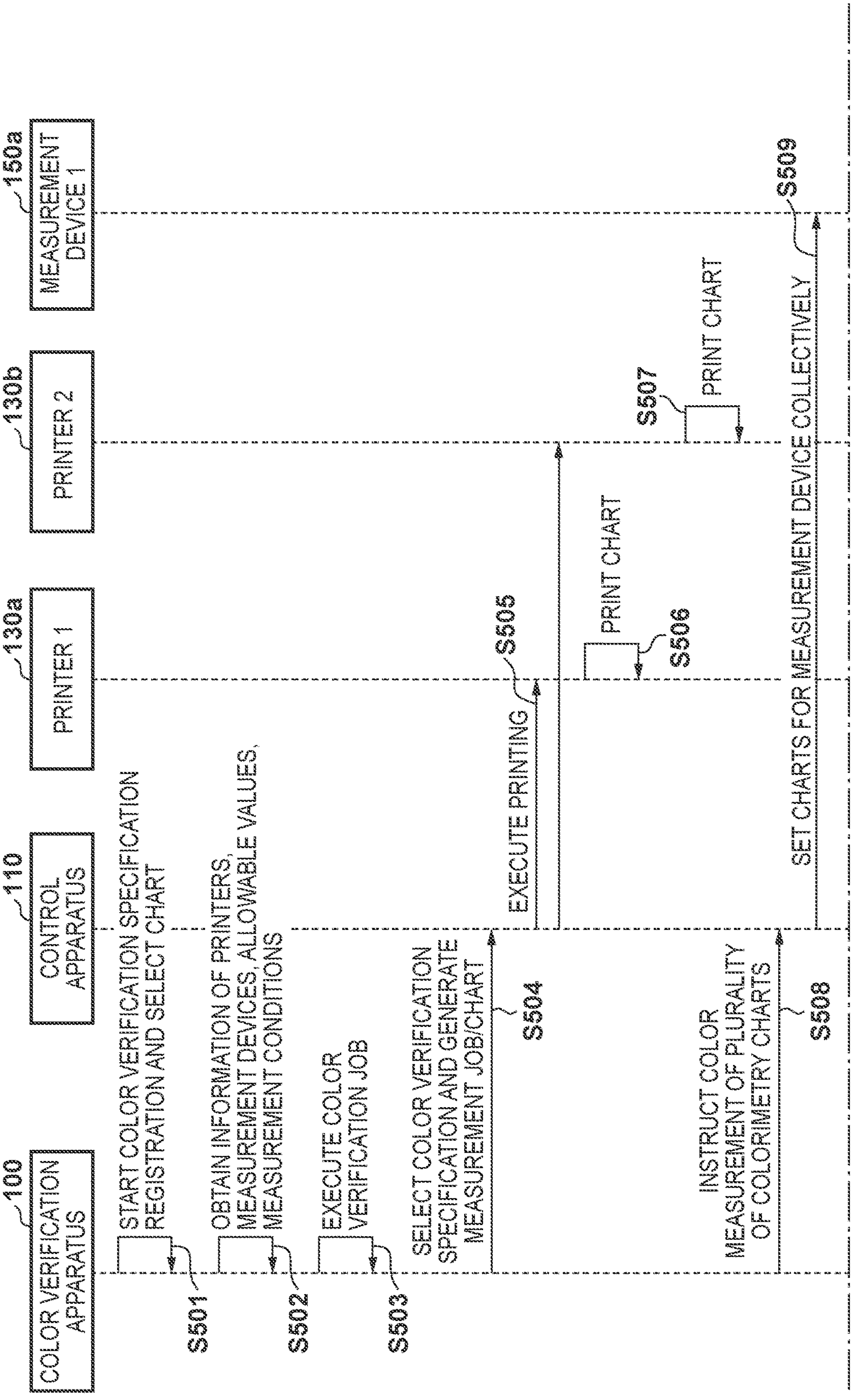
FIGS. 5A and 5B are a sequence diagram illustrating the flow of processing in the color verification system according to an embodiment.
Figure 5B:
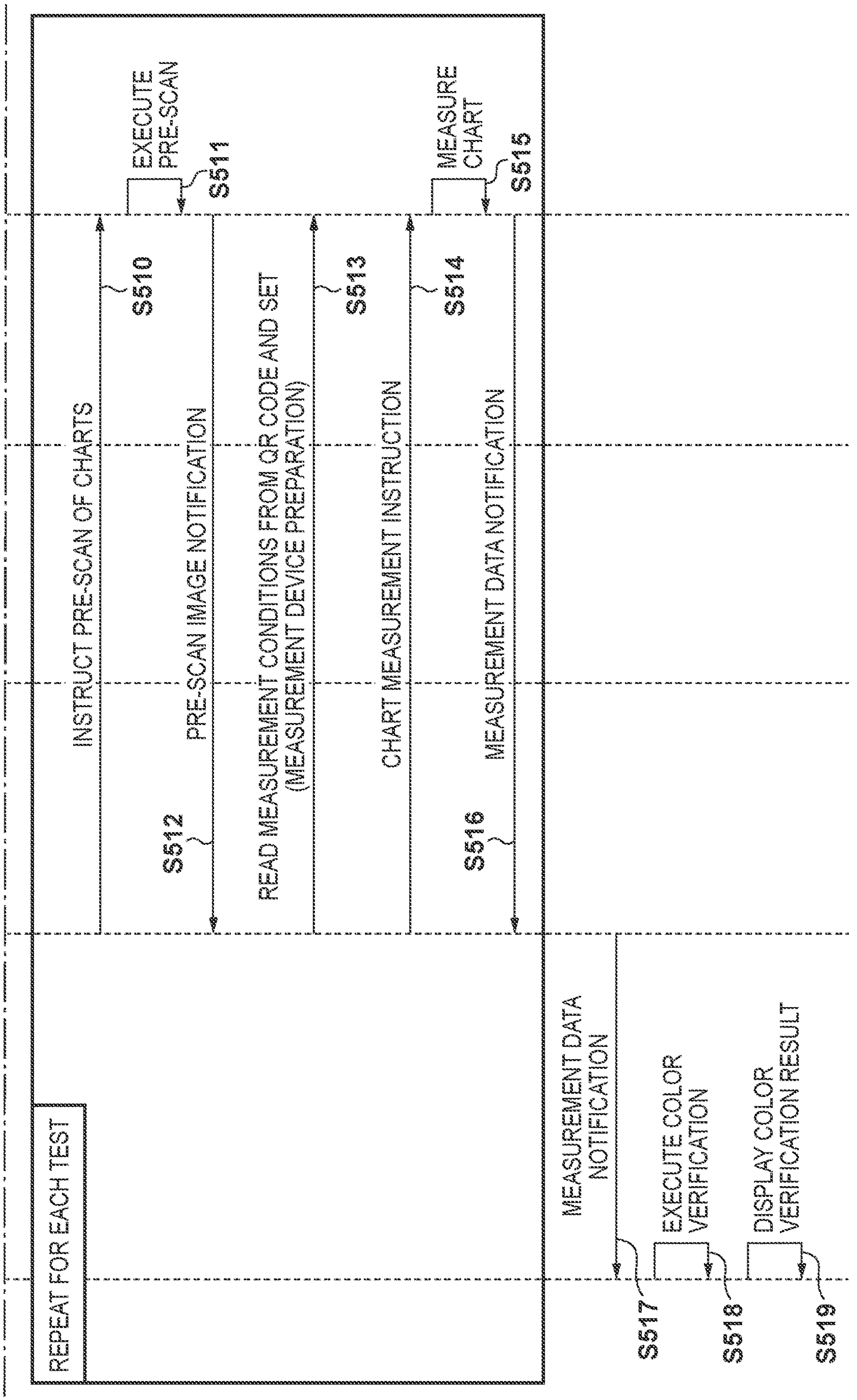

Now we will return to the description of FIGS. 5A and 5B. In S505, the control apparatus 110 transmits a plurality of chart print jobs to the target printer on the basis of the received image data. In S506, the printer 1, which received the print jobs, executes printing processing on the basis of the print jobs and outputs the charts. Also, in S507, the printer 2, which received the print jobs, executes printing processing on the basis of the print jobs and outputs the charts.

Next, in S508, the color verification apparatus 100 sends an instruction to colorimetrically measure the plurality of charts printed out from the target printer to the control apparatus 110. In S509, the control apparatus 110 executes processing to prompt the user to colorimetrically measure the plurality of charts printed out from the target printer. Specifically, a guidance screen such as that illustrated in FIG. 6J is displayed, and the user is prompted to set the measurement device for the plurality of printed out charts.

Next, in S510, the control apparatus 110 instructs the selected measurement device (in this example, the measurement device 1) to pre-scan the plurality of charts printed out from the target printer. In S511, the selected measurement device performs a pre-scan of the plurality of charts. In S512, after pre-scanning is complete, the selected measurement device transmits image data corresponding to the plurality of obtained charts to the control apparatus 110.

In S513, when the control apparatus 110 obtains the pre-scanned images, the control apparatus 110 determines whether or not the measurement target chart set for the measurement device in S509 is a chart corresponding to the measurement job generated in S504. For example, by discerning the IDs formed on the charts, the control apparatus 110 determines whether or not the charts are a chart corresponding to the measurement job. In the case of yes, the colorimetric measurement conditions corresponding to the measurement job are obtained by reading the code image embedded in the chart and transmitted to the measurement device. Then, and the colorimetric measurement conditions of the measurement device are automatically switched. The colorimetric measurement condition setting processing will be described below in detail. The processing of S510 to S513 is an example of an obtaining process.

In S514, the control apparatus 110 causes the measurement device to sequentially colorimetrically measure the plurality of charts printed out from the target printer. Thereafter, when the user sets the plurality of charts in the measurement device and issues an instruction to start measuring, in S515, the selected measurement device (in this example, the measurement device 1) measures the color values of each patch on the chart. In S516, after measurement is complete, the selected measurement device stores the obtained colorimetrically measured data and the measurement job ID as data and transmits this data to the control apparatus 110.

In S517, the control apparatus 110 receives the data set with the colorimetrically measured data and the measurement job ID from the selected measurement device and transfers the data to the color verification apparatus 100. In S518, the verification processing unit 406 uses the data and executes processing to verify the color accuracy of the printer associated with the corresponding measurement job ID. In a case when the data is constituted by a plurality of measurement job IDs, color verification processing is executed for each measurement job ID.

In S519, the UI control unit 402 displays the verification results on the display unit 105. FIG. 6I illustrates a report results screen displaying the verification results. As illustrated in FIG. 6I, on the report results screen, an average value 825 of the color difference of each patch, a maximum value 826, and the color difference of primary colors (CMYK) 827 to 830 are displayed together with the pass/fail (OK/NG) result for each verification item. The user can understand the color variation state of the target printer via such a report results screen. Also, in a case when the verification result is a fail (NG), the printer color variation can be suppressed within a specified value by reconfiguring the print profile or performing a correction task using the printer color correction function.

The foregoing has been a flow of the overall processing executed in the color verification system according to the present embodiment. Note that the control apparatus 110 may send a preparation instruction to the selected measurement device together with the display prompting the user to colorimetrically measure the chart in order to cause calibration to be performed before the start of measurement.

Colorimetric Measurement Condition Setting Processing

Figure 8:
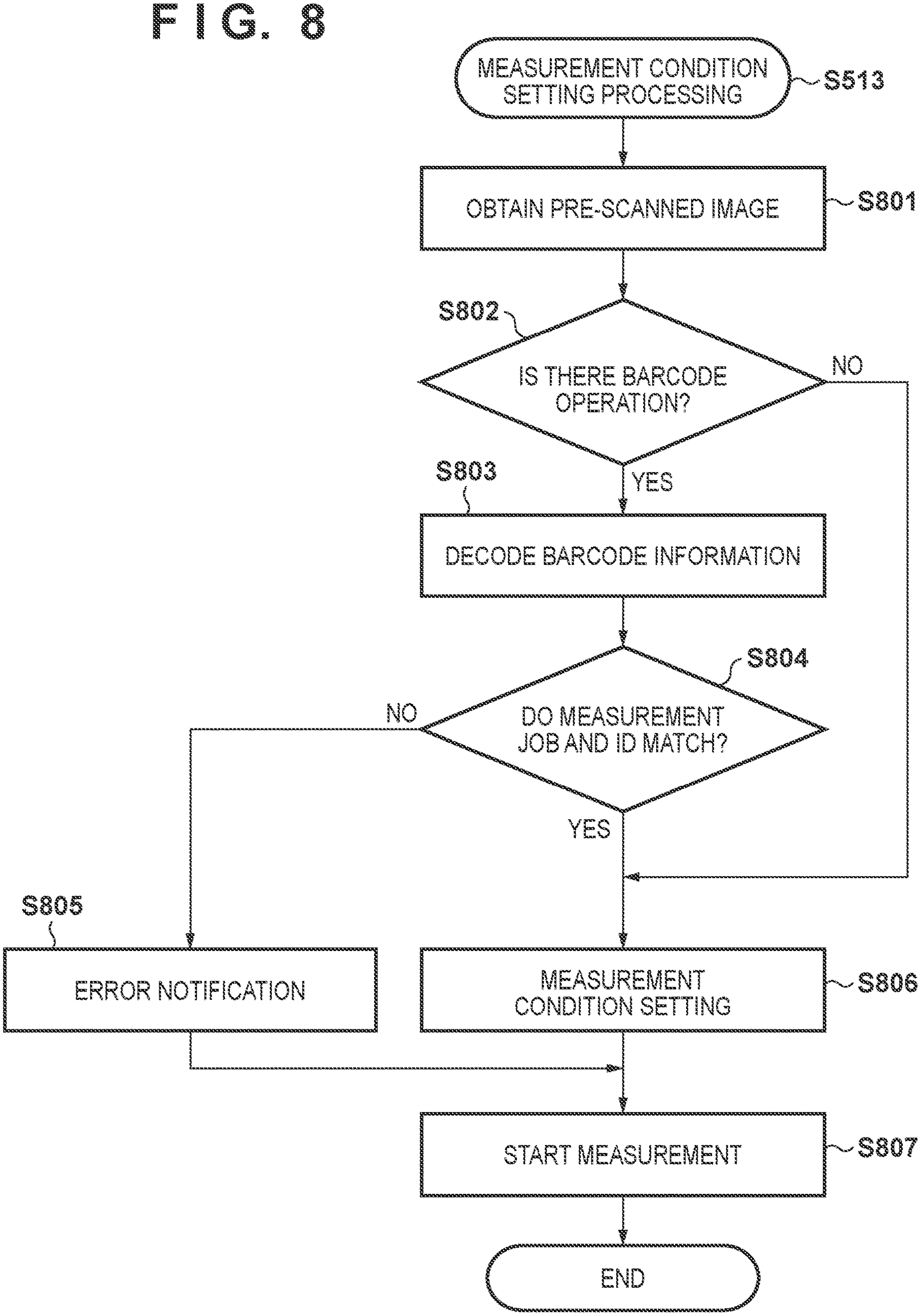
FIG. 8 is a diagram for describing the colorimetric measurement condition setting processing flow of S513 according to an embodiment.

Next, a detailed processing process for the colorimetric measurement condition setting processing (S513) according to the present embodiment will be described with reference to FIG. 8. The processing described below, for example, is implemented by the CPU 101 of the color verification apparatus 100 loading a program corresponding to the colorimetric measurement control unit 405 from the ROM 102 to the RAM 103 and executing the program. Note that, hereafter, "S" denotes the term "step".

In S801, the colorimetric measurement control unit 405 obtains the pre-scanned image data transmitted from the selected measurement device in S512. Next, in S802, the colorimetric measurement control unit 405 determines whether or not a barcode (code image) exists in the image data for the pre-scanned image data of the chart obtained in S801. Specifically, binarization processing is executed on the image data and the image is sequentially scanned to execute labeling processing and detect the region (hole) surrounded by black. Next, the number of white regions in the hole is counted, and, if the number is a predetermined number, it is determined to be a barcode label, and the process proceeds to S803. If the number is not a predetermined number, it is determined to not be a barcode label, and the process proceeds to S806. Note that the barcode determination method is not limited to the method of this embodiment, and a known technique can be used.

In S803, the colorimetric measurement setting unit 404 determines the barcode code system for the region determined to be a barcode in S802, and the barcode data listed in Table 1 is obtained by decoding. Next, in S804, the colorimetric measurement setting unit 404 determines whether or not the measurement job ID number corresponding to the 11th to 46th digit of the barcode data (see Table 3) obtained in S803 corresponds to one of the plurality of measurement job IDs generated in S508. In the case of yes, the process proceeds to S806. In the case of no, the process proceeds to S805.

Figure 7:
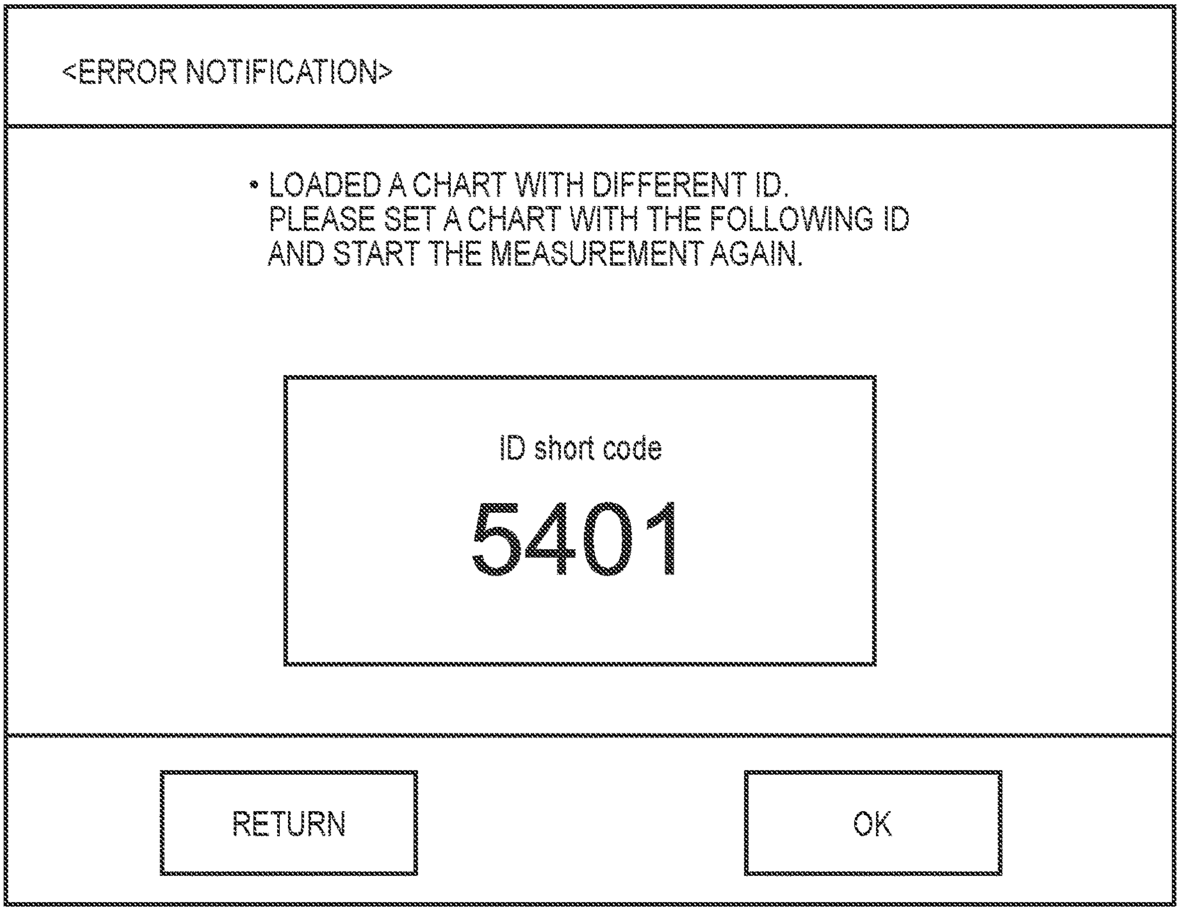
FIG. 7 is a diagram illustrating an example of an error notification of the display unit 105 according to an embodiment.

In a case when no is determined in S804, in S805, the colorimetric measurement setting unit 404 displays an error notification on the display unit 105. FIG. 7 illustrates an error notification screen that displays an error notification. In a case when the measurement target chart set for the measurement device has an ID different from any of the measurement jobs generated in S508, as illustrated in FIG. 7, the UI control unit 402 causes the display unit 105 to display the correct ID on the error notification screen. Also, the UI control unit 402 causes a message to be displayed on the error notification screen prompting for measurement to be started again. The user can set the chart with the correct ID for the target measurement device and can restart the color verification by operating the OK button of the error notification screen.

In a case when yes is determined in S804, in S806, the colorimetric measurement setting unit 404 uses the colorimetric measurement condition numbers corresponding to the 48th to 51st digits of the barcode data (see Table 3) obtained in S803 to obtain the colorimetric measurement conditions to be set. Thereafter, the colorimetric measurement conditions of the measurement device are switched by the colorimetric measurement setting unit 404 notifying the measurement device of the colorimetric measurement conditions. In S807, the colorimetric measurement control unit 405 notifies the measurement device of a colorimetric measurement instruction and ends the processing of the present flowchart.

As described above, for the plurality of charts printed by the printing apparatus, the information processing apparatus according to the present embodiment obtains colorimetric measurement conditions for each chart for when colorimetrically measuring using the measurement device. Also, the present information processing apparatus, while switching the colorimetric measurement conditions for each chart according to the obtained information, causes the measurement device to sequentially colorimetrically measure the plurality of charts and verifies the color accuracy of the printing apparatus from the colorimetrically measured values of the plurality of charts. According to the present embodiment, in a case when a plurality of color verifications are performed in one measurement job, a job including a plurality of measurements is generated and the plurality of printed charts are collectively colorimetrically measured all at once. At this time, using the code image indicating the ID and the code image embedded in the chart, the colorimetric measurement conditions corresponding to each measurement job are obtained, and colorimetric measurement is performed collectively all at once while automatically switching the colorimetric measurement conditions of the measurement device. Accordingly, a colorimetrically measuring operation can be performed once for a plurality of color verifications while automatically switching the colorimetric measurement conditions. Thus, the user-friendliness can be improved.

Second Embodiment

The second embodiment of the present invention will be described below. In the first embodiment described above, when a plurality of color verifications are performed in one measurement job, a job including a plurality of measurements is generated, and a plurality of printed charts are collectively colorimetrically measured all at once. According to this embodiment, at this time, using the code image indicating the ID and the code image embedded in the chart, the colorimetric measurement conditions corresponding to each measurement job are obtained, and colorimetric measurement is performed collectively all at once while automatically switching the colorimetric measurement conditions of the measurement device. However, depending on the type of measurement device, a pre-scan function may not be provided. Also, some measurement devices cannot obtain the measuring conditions by reading the ID and code image embedded in the chart.

The present embodiment focuses on this point, and, in a case when a plurality of color verifications are performed in one measurement job using a measurement device without a pre-scan function, first, depending on the plurality of designated color verification tests, a colorimetric measurement order for the plurality of charts is decided. In the embodiment described herein, subsequently, the colorimetric measurement order of the charts and the colorimetric measurement conditions are transmitted from the color verification apparatus 100 to the control apparatus 110 via the network, and the colorimetric measurement conditions for the measurement device are automatically switched while the colorimetric measurement order of the charts is displayed to the user to perform color verification.

Note that the basic configuration of the color verification system, and the like, that shares matters with the first embodiment and thus will not be described. A conceptual diagram indicating the overall configuration of the color verification system according to the present embodiment is similar to that of the first embodiment and is thus not described. Also, a block diagram indicating the hardware configuration of the color verification apparatus 100 and the control apparatus 110 according to the present embodiment is similar to that of the first embodiment and is thus not described. Also, a block diagram indicating the main functional configuration of the color verification apparatus 100 and the control apparatus 110 according to the present embodiment is similar to that of the first embodiment and is thus not described.

Overall System Processing Flow

Figure 10A:
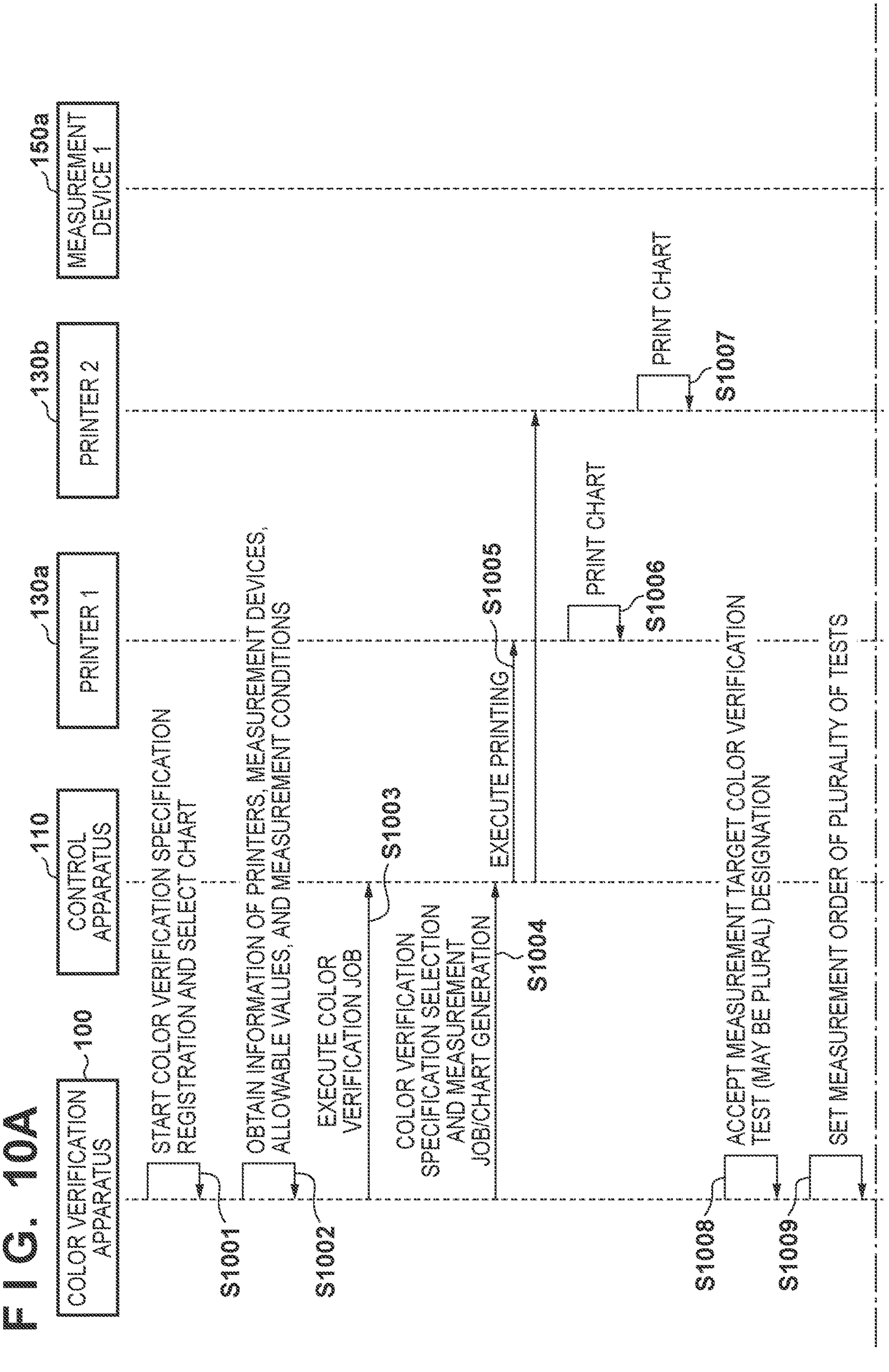
FIGS. 10A and 10B are a sequence diagram illustrating the flow of processing in the color verification system according to an embodiment.
Figure 10B:
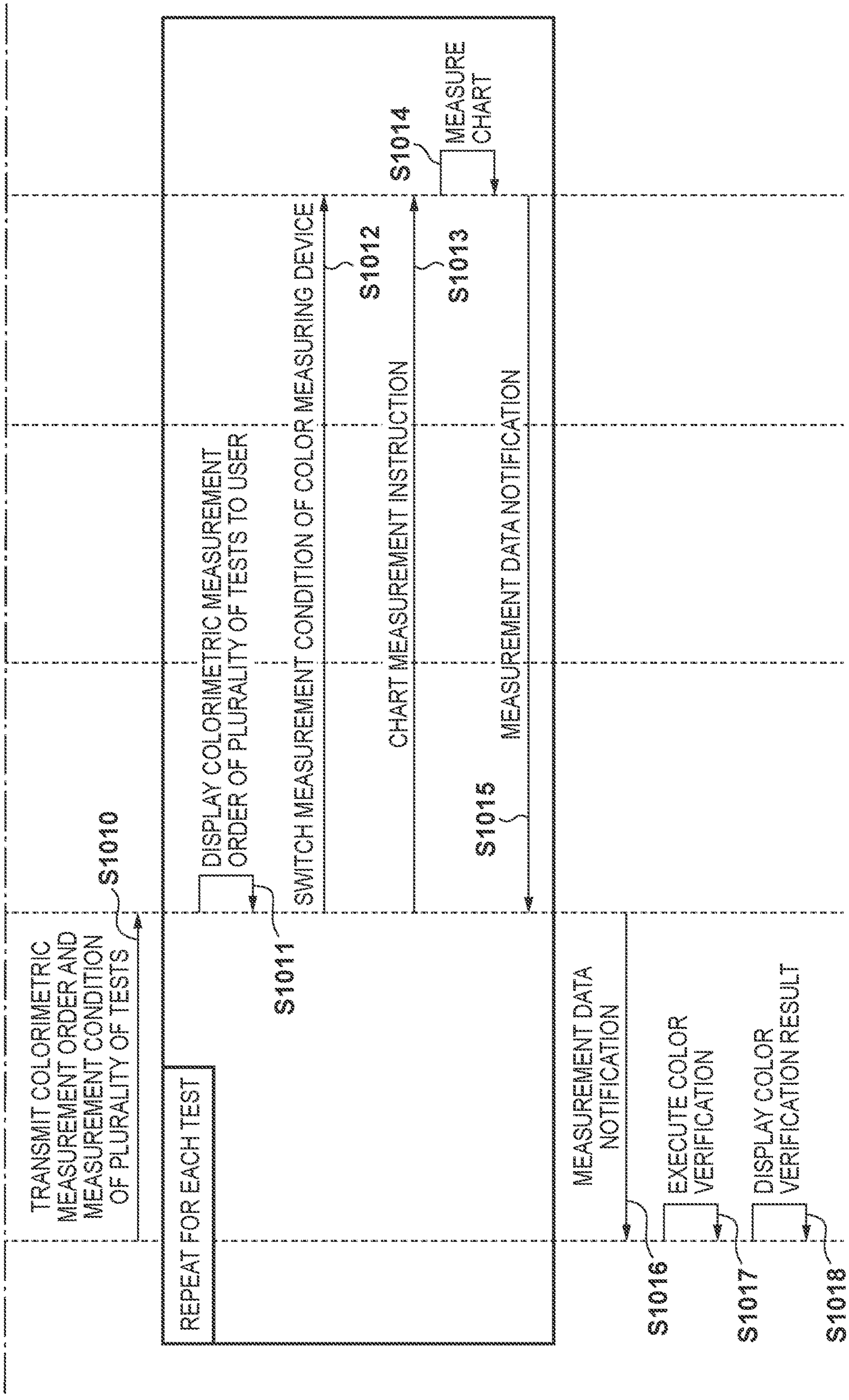

A sequence indicating the flow of processing in the color verification system according to the present embodiment will now be described with reference to FIGS. 10A and 10B. The flow of processing for the entire color verification system according to the present embodiment will be described following the sequence diagram in FIGS. 10A and 10B, and the differences from the first embodiment will be focused on. The process from color verification specification registration start (S1001) to color verification job execution (S1003) corresponds to the process from S501 to S503 in FIG. 5A of the first embodiment and will thus not be described.

Figure 9D:
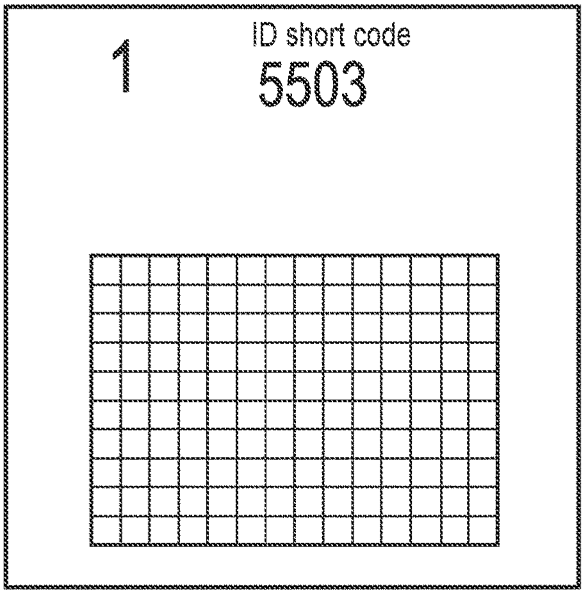

In S1004, when "Color verification specification 1" and "Color verification specification 2" of display regions 625 and 626 of the color verification specification selection screen in FIG. 6H are operated, the measurement job generation unit 403 executes processing to generate a measurement job corresponding to each color verification specification. Note that, by selecting a plurality of color verification specifications in one measurement job, a measurement job can be generated to include a plurality of color verifications. When a measurement job is generated, the color verification target printer, the measurement device to be used, the colorimetric measurement conditions, and a chart and allowable values used in color verification registered in the process from S501 to S503 are uniquely set. In the first embodiment, at this time, the image data of the chart is provided with a code image including the colorimetric measurement conditions. However, in the present embodiment, it is assumed that color verification is performed using a measurement device without a pre-scan function. Thus, the chart is generated without providing a code image to the chart as illustrated in FIG. 9D, for example.

Figure 6L:
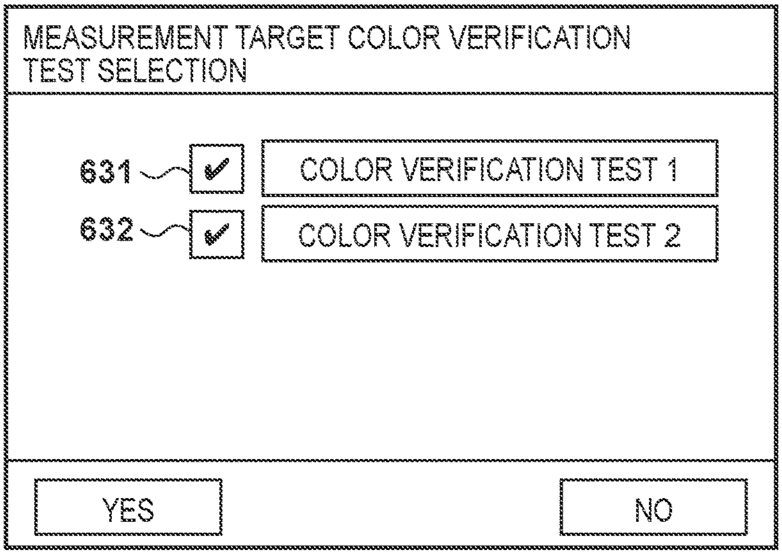

The process from printing execution (S1005) to chart printing (S1007) is the same (corresponds to the process from S505 to S507 in the sequence diagram of FIG. 5A) as in the first embodiment and will thus not be described. In S1008, the color verification apparatus 100 displays the measurement target color verification test selection screen illustrated in FIG. 6L and accepts the designation of a color verification test (multiple selections possible) for the measurement target. In S1004, measurement jobs for "Color verification specification 1" and "Color verification specification 2" are generated, and thus, in the present embodiment, a maximum of two color verification tests can be selected.

In S1009, the color verification apparatus 100 decides the colorimetric measurement order of the charts corresponding to the measurement target color verification test selected in S1008. The method for deciding the colorimetric measurement order includes storing the order in which the measurement target color verification tests were selected in S1008 and setting this order as the colorimetric measurement order. In another embodiment, the method may include checking the colorimetric measurement conditions of each color verification test selected in S1008, grouping together tests with the same colorimetric measurement conditions, and deciding the colorimetric measurement order per group. A method for checking the same colorimetric measurement conditions may plausibly include checking whether the items listed in Table 5 are the same conditions, or the like. Note that the method may include checking whether the items are the same measuring conditions and being able to colorimetrically measure a plurality of charts collectively with one test with the same measuring conditions. Also, the colorimetric measurement conditions can be obtained according to the colorimetric measurement order by the color verification apparatus 100 obtaining the registered color verification specification information from the HDD 104 according to the decided colorimetric measurement order. In a case when the registration destination of the color verification specification is the HDD 104 of the control apparatus 110, this processing may be executed by the control apparatus 110.

TABLE 5

| |
|---|
| Check item with same measurement condition |
| Type of measurement device |
| Illumination condition |
| Illuminant (observation light source) |
| Angle of view |

Figure 6M:
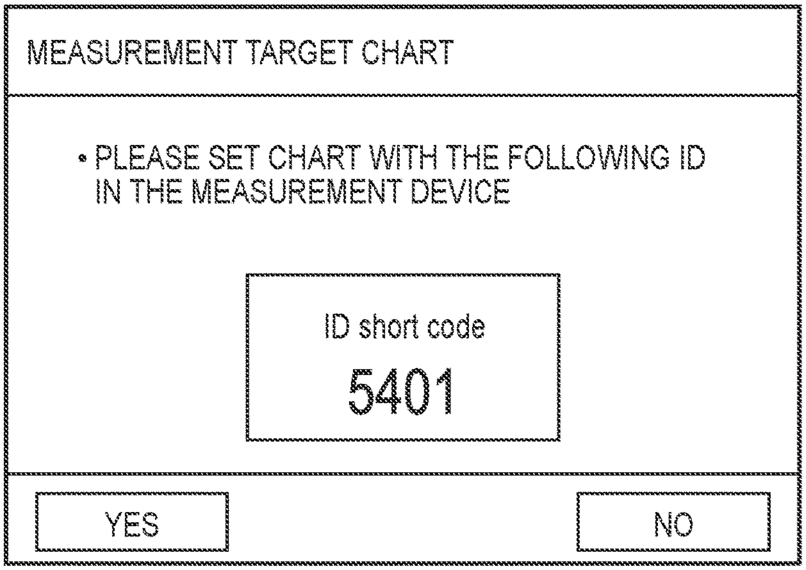

In S1010, the color verification apparatus 100 transmits, to the control apparatus 110, the colorimetric measurement order and the colorimetric measurement conditions of the charts corresponding to the tests decided in S1009. The colorimetric measurement conditions are stored in the HDD 104 of the color verification apparatus 100 or the control apparatus 110 for each registered color verification specification, and the corresponding colorimetric measurement conditions are obtained. Next, in S1011, the control apparatus 110 displays to the user the colorimetric measurement order of the tests and prompts the user with a chart to be measured. Specifically, as illustrated in FIG. 6M, the user is instructed of the next chart to be measured by the UI control unit 402 displaying the measurement job ID (for display) provided to the charts on the UI screen.

Next, in S1011, the control apparatus 110 transmits the colorimetric measurement conditions to the measurement device according to the colorimetric measurement order of the charts decided in S1009 and switches the colorimetric measurement conditions of the measurement device. The process from chart measurement instruction (S1013) to measurement data notification (S1015) is the same (corresponds to the process from S514 to S516 in the sequence diagram of FIG. 5B) as in the first embodiment and will thus not be described. Then, S1011 to S1015 are repeated a number of times equal to the number of color verification tests according to the colorimetric measurement order for the charts. Also, the process from measurement data notification (S1016) to color verification result display (S1018) is the same (corresponds to the process from S517 to S519 in the sequence diagram of FIG. 5B) as in the first embodiment and will thus not be described.

As described above, the information processing apparatus according to the present embodiment decides the colorimetric measurement order for the plurality of charts, and the pre-registered colorimetric measurement conditions for each chart are obtained from the storage unit according to the decided colorimetric measurement order. Thus, according to the present embodiment, in a case when a plurality of color verifications are performed in one measurement job, a plurality of measurement jobs are generated all at once and the plurality of printed charts can be collectively colorimetrically measured all at once. At this time, in a case where a plurality of color verifications are performed in one measurement job using a measurement device without a pre-scan function, first, depending on the plurality of designated color verification tests, a colorimetric measurement order for the plurality of charts is decided. Subsequently, the colorimetric measurement order of the charts and the colorimetric measurement conditions are transmitted from the color verification apparatus 100 to the control apparatus 110 via the network, and the colorimetric measurement conditions for the measurement device are automatically switched while the colorimetric measurement order of the charts is displayed to the user to perform color verification. Note that, in a case when the color verification apparatus 100 and the control apparatus 110 are integrally formed, the transmission processing described above is skipped. Accordingly, even when using a measurement device without a pre-scan function, a colorimetrically measuring operation can be performed once for a plurality of color verifications while automatically switching the colorimetric measurement conditions. This increases user-friendliness.

Third Embodiment

The third embodiment of the present invention will be described below. In the first embodiment described above, when color verification is performed using a target color set according to the ISO standard, or the like, a job including a plurality of measurements is generated, and a plurality of printed charts are collectively colorimetrically measured all at once. According to this embodiment, at this time, using the code image indicating the ID and the code image embedded in the chart, the colorimetric measurement conditions corresponding to each measurement job are obtained, and colorimetric measurement is performed collectively all at once while automatically switching the colorimetric measurement conditions of the measurement device.

However, after a user uses a printer to perform color matching adjustment with a profile, the user may check whether it is operating stably using another printer. In this case, after the user registers a set target color, the target color and the printed color are compared, and whether the color accuracy satisfies the pass criterion is checked.

The present embodiment will focus on this point, and described below is a flow for registering a target value corresponding to a color verification test chart using a user-defined color (profile) and a color verification flow, in a case when color verification is performed using a target color set by the user. According to this embodiment, at this time, using the code image indicating the ID and the code image embedded in the chart, the colorimetric measurement conditions corresponding to each measurement job are obtained, colorimetric measurement is performed collectively all at once while automatically switching the colorimetric measurement conditions of the measurement device, and the target value is registered.

Note that the basic configuration of the color verification system, and the like, that shares matters with the first embodiment and the second embodiment and thus will not be described. A conceptual diagram indicating the overall configuration of the color verification system according to the present embodiment is similar to that of the first embodiment and is thus not described. A block diagram indicating the hardware configuration of the color verification apparatus 100 and the control apparatus 110 according to the present embodiment is similar to that of the first embodiment and is thus not described. A block diagram indicating the main functional configuration of the color verification apparatus 100 and the control apparatus 110 according to the present embodiment is similar to that of the first embodiment and is thus not described.

Overall System Processing Flow

A flow of processing in the color verification system in a case when color verification is performed using a target color set by the user according to the present embodiment will now be described with reference to FIGS. 11A and 11B. The flow of processing for the entire color verification system in a case when a plurality of color verifications are performed using the measurement device 1 for the printer 1 and the printer 2 by outputting a plurality of charts will be described following the sequence diagram in FIGS. 5A and 5B, and the differences from the first embodiment will be focused on.

The color verification specification registration start (S1101) corresponds to S501 in FIG. 5A of the first embodiment and will thus not be described. In S1102, the color verification specification registration unit 401 obtains a list of the printers 1 to 3 managed by the control apparatus 110 and printer status information of each printer. First, the color verification specification registration unit 401 accepts a press of “select printer” on the display region 608 of the color verification specification detailed selection screen illustrated in FIG. 6C. The following printer selection operation corresponds to S502 in FIG. 5A of the first embodiment and will thus not be described. The color verification specification registration unit 401 obtains a list of the measurement devices 1 to 3 managed by the control apparatus 110 and specification information of each measurement device and measurement device status information of each measurement device.

Next, the color verification specification registration unit 401 accepts a press of “select measurement device” on the display region 609 of the color verification specification detailed selection screen illustrated in FIG. 6C. The following measurement device selection operation corresponds to S502 in FIG. 5A of the first embodiment and will thus not be described. Next, the color verification specification registration unit 401 accepts a press of “input allowable value” on the display region 610 of the color verification specification detailed selection screen illustrated in FIG. 6C. The following allowable value input operation corresponds to S502 in the sequence diagram of FIG. 5A of the first embodiment and will thus not be described.

Figure 6N:
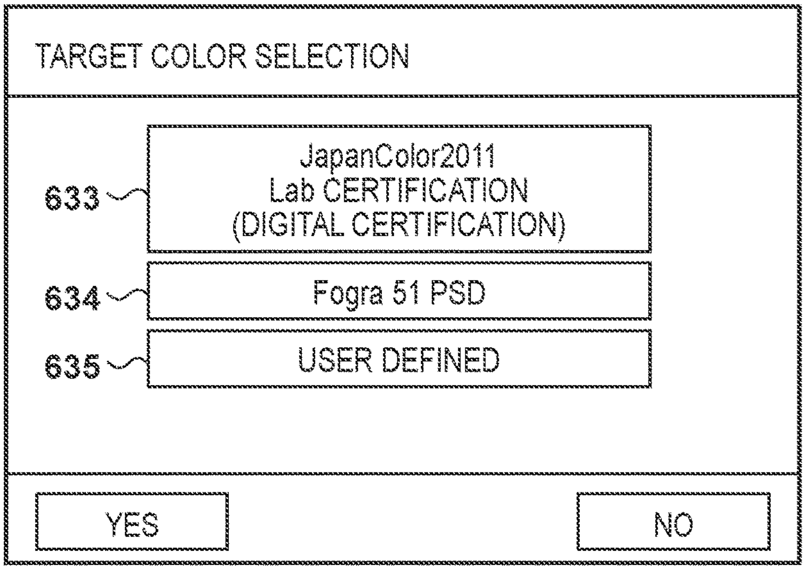

Next, the color verification specification registration unit 401 accepts a press of “input target value” on the display region 606 of the color verification specification detailed selection screen illustrated in FIG. 6C. Thereafter, the screen transitions to the target color selection screen illustrated in FIG. 6N, and processing to receive a target value for each patch in the used chart is executed. Specifically, a user selection is received via the UI screen displayed on the display unit 105 via the UI control unit 402, and the setting processing unit 407 sets the target color value associated with the selection. On this screen, items 633 to 635 can be selected for the target color. Item 633 denotes a selection item for “JapanColor2011 Lab certified (digital certification) in accordance with Japan Color certification, item 634 denotes a selection item for “Fogra 51 PSD” in accordance with Fogra certification, and item 635 denotes a selection item for “User defined” for a user-defined target color. In this example described herein, color verification is performed using a target color defined by the user. Thus, a press of “User defined” 635 is received. In this case, “user defined” is set as the target color selection, and the specific numerical values of the target values may be in an unset state.

The process from color verification job execution (S1103) to measurement data notification (S1116) corresponds to the process from S503 to S516 in the sequence diagram of FIGS. 5A and 5B of the first embodiment and will thus not be described. In S1117, the control apparatus 110 notifies the color verification apparatus 100 of the measurement data. The color verification apparatus 100 determines whether or not the target value of the color verification specification selected in S1104 is already set. In a case when it is not already set, the process proceeds to S1118. In a case when it is already set, the process proceeds to S1120.

In S1118, the color verification apparatus 100 obtains the input profile and the output profile used when printing the chart in S1105 and obtains a theoretical measurement value corresponding to the color verification chart using the obtained profiles. A detailed obtaining method will be described below. First, the basic profile configuration will be described.

Figure 12:
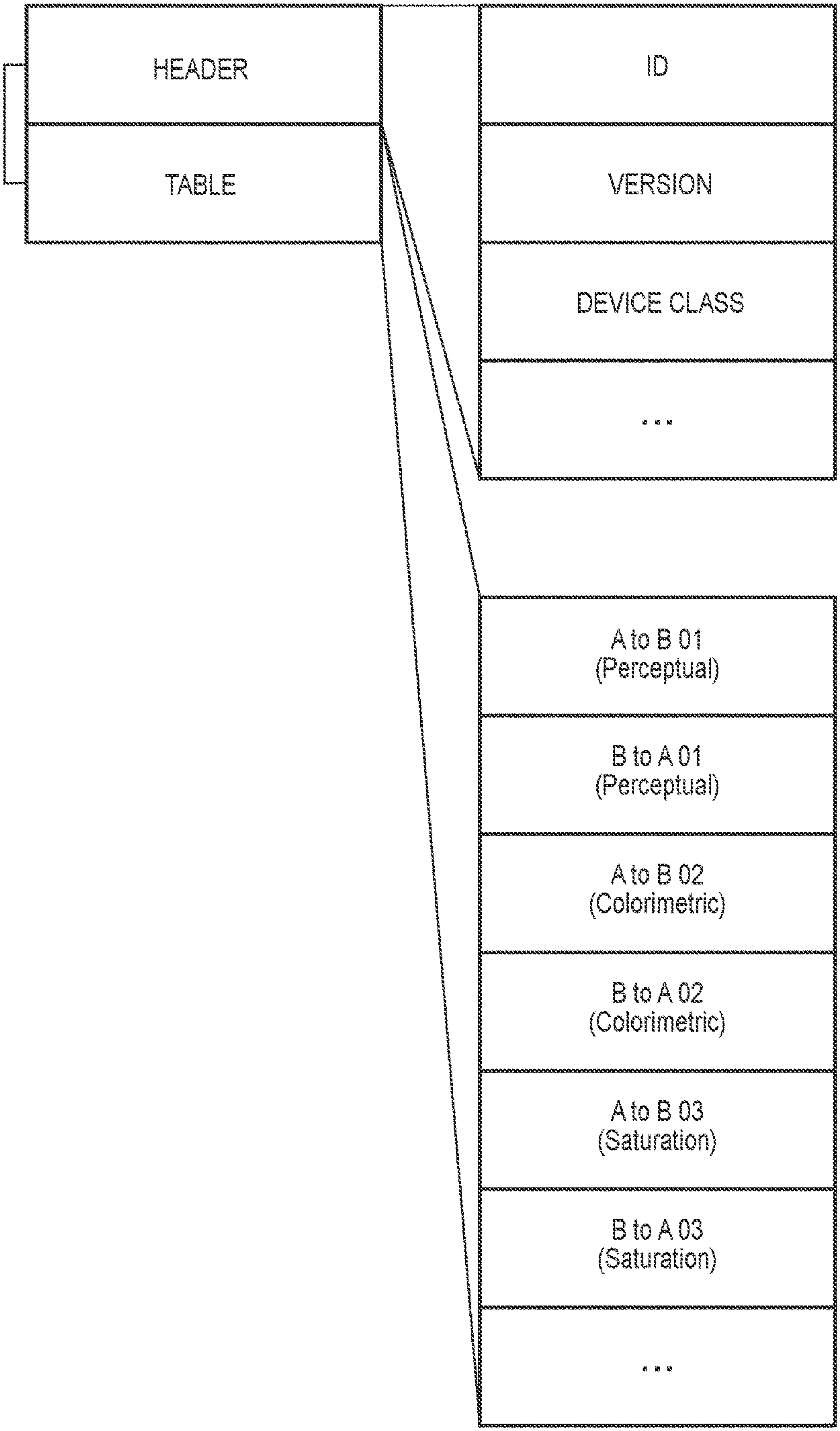
FIG. 12 is a diagram illustrating an example of a profile configuration according to an embodiment.

FIG. 12 schematically illustrates a profile. The profile includes a header where basic information relating to various types of profiles is described and a table where information used in color matching processing is described. In the header, for example, ID information, version information, device class information indicating the basic type of output device, and the like, are stored. The table stores “B to A” information describing the color processing parameters relating to the processing to convert image data B in PCS space independent of the output device into image data A dependent on the color space of the device. Also stored in “A to B” information describing the color processing parameters relating to the processing to convert image data A dependent on the color space of the device into image data B in the PCS space independent of the device.

The "B to A" information and the "A to B" information are stored in association with each color matching method supported by the color matching processing module. The color matching method includes, for example, perceptual color matching, colorimetric color matching, saturation color matching, and the like. Here, perceptual color matching emphasizes gradations of color and is best suited for photographic images, and the like. Colorimetric color matching aims to reproducing a colorimetrically exact color and is best suited for logo-type images and the like. Saturation color matching emphasizes the brightness or vivacity of a color and is best suited for graphs, computer graphics (CG), and similar images. Also, the color processing parameters illustrated in FIG. 12 are given numbers to show which color matching method they correspond to, with "01" indicating "perceptual", "02" indicating "colorimetric", and "03" indicating "saturation".

Figure 13:
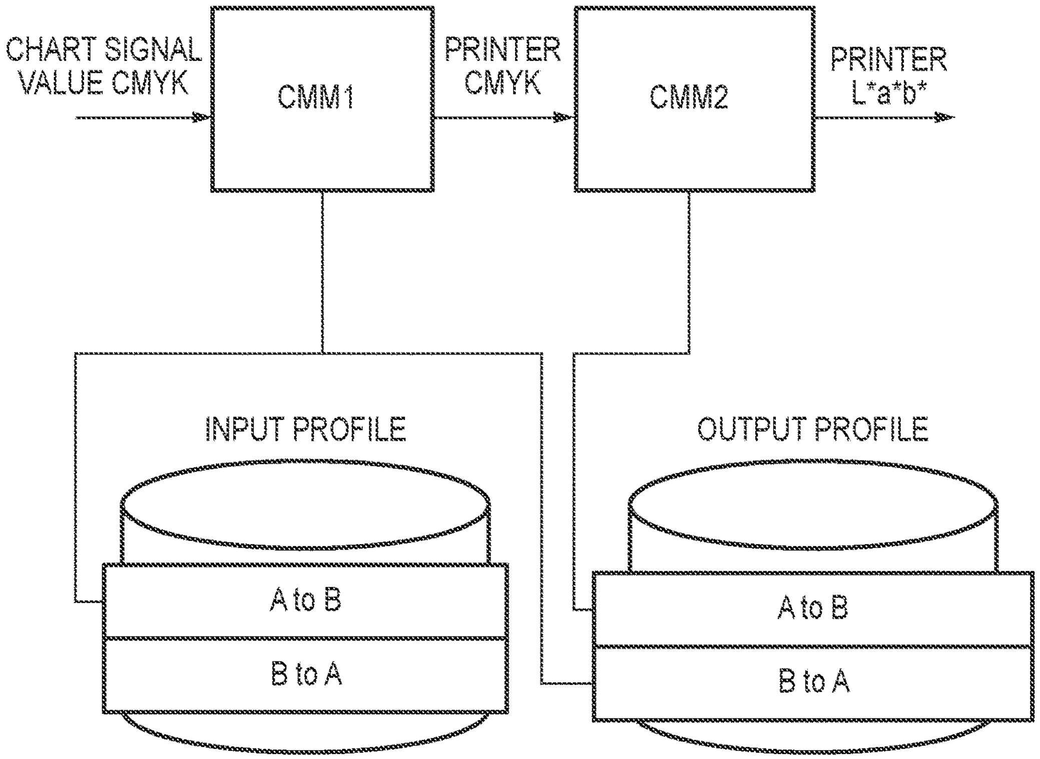
FIG. 13 is a diagram for schematically describing the flow of a color matching processing process according to an embodiment.
Figure 14:
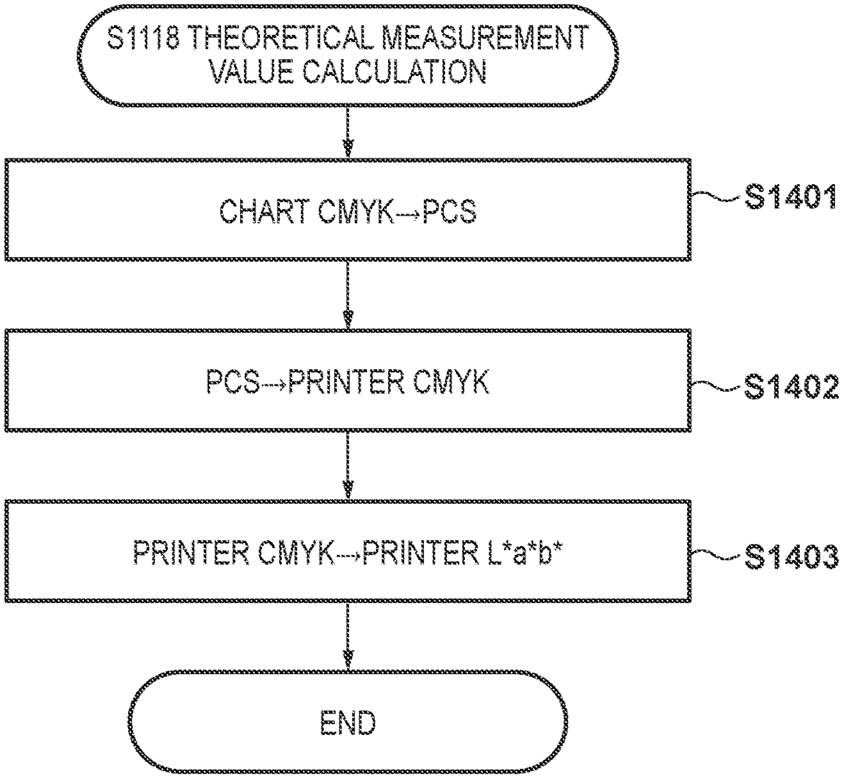
FIG. 14 is a flowchart illustrating a process for obtaining a theoretical measurement value according to an embodiment.

Next, the color matching processing will be described using FIGS. 13 and 14. FIG. 13 illustrates an overview of the flow of the color matching processing, and FIG. 14 illustrates a flowchart of the detailed processing process for obtaining the theoretical measurement value in S1118 described above. The processing described below, for example, is implemented by the CPU 101 of the color verification apparatus 100 loading a program corresponding to the colorimetric measurement control unit 405 from the ROM 102 to the RAM 103 and executing the program.

In S1401, the colorimetric measurement control unit 405 of the color verification apparatus 100 executes processing to convert the CMYK value (chart CMYK) constituting the color verification chart into PCS data (for example, *L*a*b*). The module that executes this processing is denoted with "CMM1" in FIG. 13. In this processing, the "A to B" information of the input profile and the "B to A" information corresponding to the designated color matching method of the output profile are set in CMM1. By executing color conversion using this information, the CMYK values are converted into PCS data.

Next, in S1402, the colorimetric measurement control unit 405 executes processing to convert the PCS data (for example, L*a*b*) into CMYK data (printer CMYK) dependent on the characteristics of the printer which is the output device. The information used is similar to that in S1401. Next, in S1403, the colorimetric measurement control unit 405 converts the CMYK data (printer CMYK) dependent on the characteristics of the printer into PCS data (for example, L*a*b*) indicating the characteristics of the printer. The module that executes this processing is denoted with "CMM2" in FIG. 13. In this processing, the "A to B" information of the output profile is set to the CMM2, and the printer CMYK values are converted into PCS data (hereafter, referred to as printer L*a*b*) indicating the characteristics of the printer by performing color conversion using the information.

The printer L*a*b* obtained via the processing described above means theoretical measurement values. Thus, theoretical measurement values corresponding to the color verification chart can be obtained. Note that, in a strict color verification, as described above in the present embodiment, it is preferable to register a measurement value measured from an actual output as the target value using a printer for performing color verification, a measurement device, and a chart that satisfies the measurement device specifications. However, in the case of a target value used in color verification with a relatively broad allowable range, the theoretical measurement value obtained in S1118 may be registered unchanged as the target value.

Figure 11A:
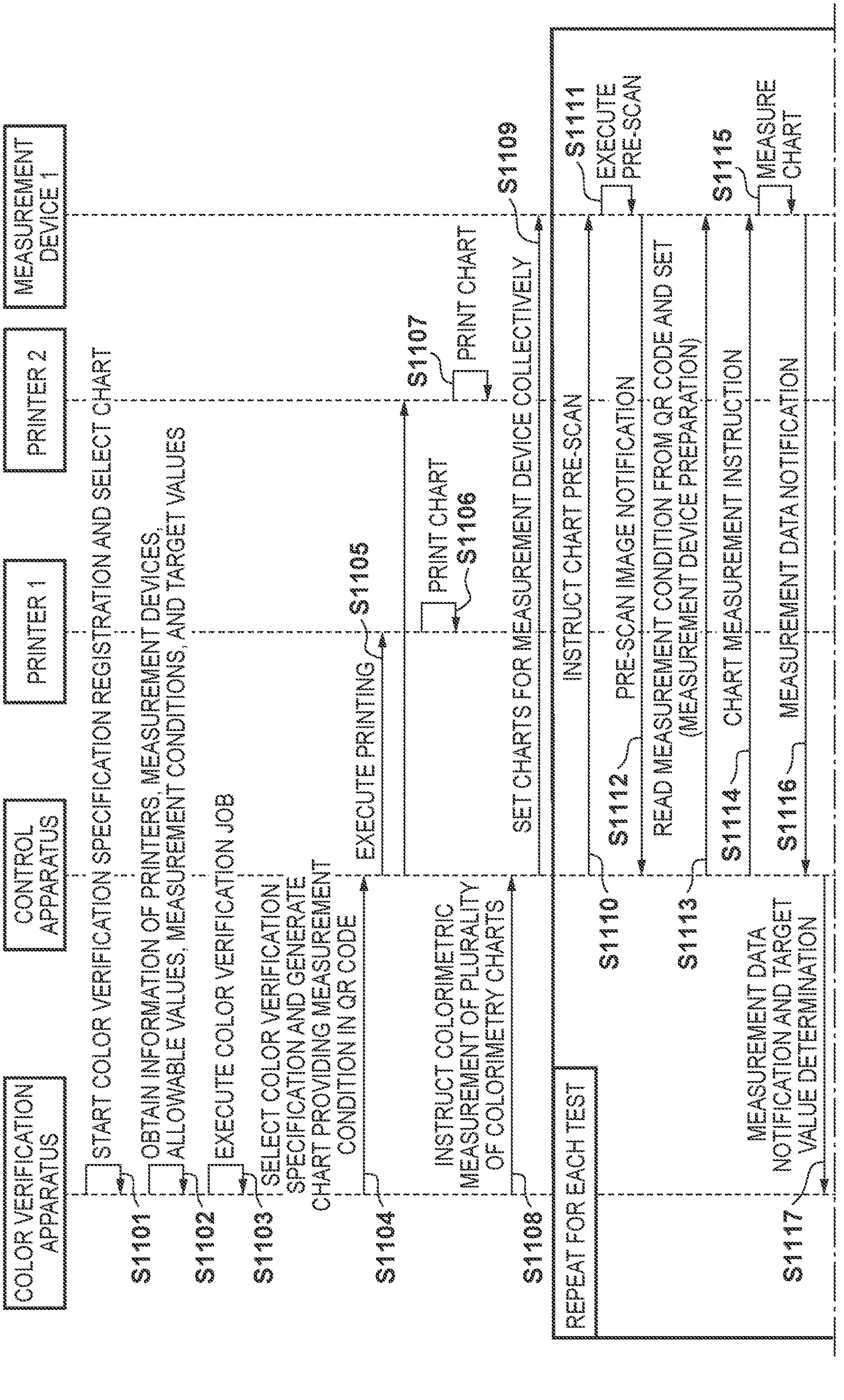
FIGS. 11A and 11B are a sequence diagram illustrating the flow of processing in the color verification system according to an embodiment.
Figure 11B:
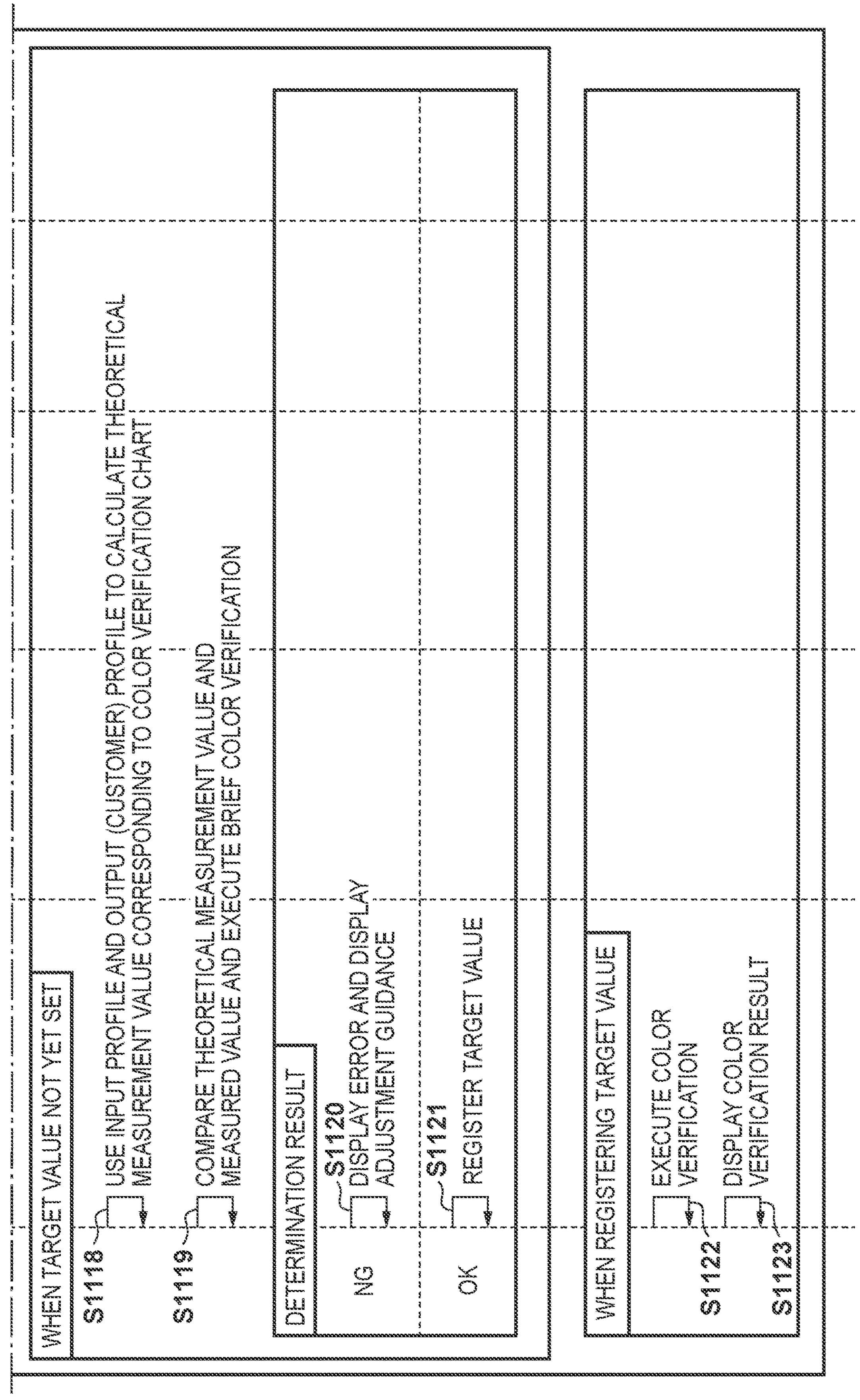

Now we will return to the description of FIGS. 11A and 11B. In S1119, the color verification apparatus 100 compares the theoretical measurement value obtained in S1118 and the measurement value obtained in S1117 and determines whether or not they are within a predetermined allowable range. In a case when they are within the allowable range, the process proceeds to S1121. In a case when they are not within the allowable range, the process proceeds to S1120. Accordingly, whether or not the measurement value obtained in S1117 is an appropriate numerical value for the target value can be checked.

In S1120, the color verification apparatus 100 displays to the user that the measurement value obtained in S1117 is outside the allowable range, prompts the user to perform an engine adjustment such as calibration, and ends the color verification. On the other hand, in S1121, the color verification apparatus 100 registers the measurement value obtained in S1117 as the target value of the color verification specification selected in S1104. Note that, in a case when there is another color verification specification with a registered target value in which the printer, the measurement device, and the chart registered in the color verification specification selected in S1104 are the same, but only the allowable range is different, the registered target value may be used as the target value of the current color verification specification.

The process from color verification execution (S1122) to color verification result display (S1123) corresponds to the process from S518 to S519 in FIG. 5B of the first embodiment and will thus not be described. As described in the first embodiment relating to the target value registration and color verification, at this time, using the ID (code) embedded in the chart, the colorimetric measurement conditions corresponding to each measurement job are obtained, and colorimetric measurement is performed collectively all at once while automatically switching the colorimetric measurement conditions of the measurement device. However, as in the second embodiment, according to the plurality of designated color verification tests, the colorimetric measurement order of the plurality of charts may be decided, the colorimetric measurement order and colorimetric measurement conditions of the charts may be transmitted via the network, and the colorimetric measurement conditions of the measurement device may be automatically switched while displaying the user the colorimetric measurement order of the charts. It goes without saying that even with such an embodiment, target value registration and color verification can be implemented with the configuration according to the present embodiment.

As described above, the information processing apparatus according to the present embodiment performs color verification using a target color set by the user. Specifically, a flow for registering a target value corresponding to a color verification test chart using a user-defined color (profile) and a color verification flow have been described. At this time, using the ID (code) embedded in the chart, the colorimetric measurement conditions corresponding to each measurement job can be obtained, colorimetric measurement can be performed collectively all at once while automatically switching the colorimetric measurement conditions of the measurement device, and the target value can be registered. Accordingly, in color verification using a user-defined target value, registering a target color value is made simple with the colorimetric measurement conditions being automatically switched. Thus, the user-friendliness can be improved.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:

one or more memory devices that store a set of instructions; and one or more processors that execute the set of instructions:

to decide a colorimetric measurement order of a plurality of charts printed by a printing apparatus, to obtain, from a storage unit according to the decided colorimetric measurement order, a colorimetric measurement condition for each chart for when colorimetrically measuring using a measurement device, the colorimetric measurement condition being registered in advance;

to cause the measurement device to sequentially colorimetrically measure the plurality of charts while switching the colorimetric measurement condition for each chart according to the obtained colorimetric measurement condition; and to verify color accuracy of the printing apparatus from a colorimetrically measured value of each one of the plurality of charts.

2. The information processing apparatus according to claim 1, wherein the one or more processors execute instructions in the one or more memory devices to cause the printing apparatus to print the plurality of charts to each include a code image indicating a colorimetric measurement condition and to cause the measurement device to read the plurality of charts as a pre-scan prior to colorimetric measurement to obtain the colorimetric measurement condition for each chart from the code image.

3. The information processing apparatus according to claim 2, wherein the one or more processors execute instructions in the one or more memory devices to switch format of the code image included in the chart depending on a function of the measurement device.

4. The information processing apparatus according to claim 3, wherein chart layout information, page number, identification information for identifying a measurement job, a value indicating a colorimetric measurement condition, and a checksum are embedded in the code image.

5. The information processing apparatus according to claim 2, wherein the one or more processors execute instructions in the one or more memory devices, in a case when a chart read by the measurement device in the pre-scan is not a correct chart, to cause a display unit to display a notification of this and identification information of a correct chart.

6. The information processing apparatus according to claim 1, wherein the one or more processors execute instructions in the one or more memory devices:

to instruct the measurement device of the colorimetric measurement order for the plurality of charts; and to cause a display unit to display identification information of the charts to be read according to the colorimetric measurement order.

7. The information processing apparatus according to claim 6, wherein the one or more processors execute instructions in the one or more memory devices to reference the colorimetric measurement condition for each one of the plurality of charts, to group together the plurality of charts according to the colorimetric measurement order, and to decide the colorimetric measurement order per group.

8. The information processing apparatus according to claim 1, wherein the one or more processors execute instructions in the one or more memory devices:

to register color verification tests with a colorimetric measurement condition set according to a type of color verification; and to generate a job for performing color verification of the plurality of charts by selecting a plurality of color verification tests from among the registered color verification tests.

9. The information processing apparatus according to claim 1, wherein the one or more processors execute instructions in the one or more memory devices:

to register color verification tests set with a user-defined colorimetric measurement condition; and to generate a job for performing color verification of the plurality of charts by selecting a plurality of color verification tests from among the registered color verification tests.

10. The information processing apparatus according to claim 8, wherein, in the color verification test, at least one of a chart type, a printing apparatus, a measurement device, a colorimetric measurement condition, and an allowable value for each verification item is set.

11. The information processing apparatus according to claim 10, wherein the colorimetric measurement condition includes at least one of a whiteness condition, an illumination condition, an illuminant, and an angle of view.

12. The information processing apparatus according to claim 11, wherein a value relating to a color difference between a colorimetrically measured value of the plurality of charts and a target color value is set for the allowable value.

13. The information processing apparatus according to claim 9, wherein the one or more processors execute instructions in the one or more memory devices to register a target color value of the printing apparatus from a colorimetrically measured value of each one of the plurality of charts.

14. The information processing apparatus according to claim 9, wherein the one or more processors execute instructions in the one or more memory devices to compare the colorimetrically measured value and a value obtained with a profile with a user-defined target color, and, if the values are within an allowable range, to register the colorimetrically measured value as a target color value.

15. The information processing apparatus according to claim 9, wherein the one or more processors execute instructions in the one or more memory devices to register the colorimetrically measured value as a target color value in a case when a target value is not set for a color verification test, and to execute color verification using the colorimetrically measured value in a case where a target value is already set.

16. The information processing apparatus according to claim 9, wherein the one or more processors execute instructions in the one or more memory devices to cause a color verification unit to register a value obtained with a profile with a user-defined target color as a target value.

17. The information processing apparatus according to claim 9, wherein the one or more processors execute instructions in the one or more memory devices to cause a color verification unit, when registering a new test specification, to register the test specification using a target color value if the test specification has an identical predetermined condition for a color verification specification and the target color value is already registered.

18. A method of controlling an information processing apparatus, the method comprising:

deciding a colorimetric measurement order of a plurality of charts printed by a printing apparatus, obtaining, from a storage unit according to the decided colorimetric measurement order, a colorimetric measurement condition for each chart for when colorimetrically measuring using a measurement device, the colorimetric measurement condition being registered in advance;

performing control to cause the measurement device to sequentially colorimetrically measure the plurality of charts while switching the colorimetric measurement condition for each chart according to colorimetric measurement condition obtained in the obtaining; and verifying color accuracy of the printing apparatus from a colorimetrically measured value of each one of the plurality of charts in the performing control.

19. A method of controlling an information processing apparatus, the method comprising:

deciding a colorimetric measurement order of a plurality of charts printed by a printing apparatus, obtaining, from a storage unit according to the decided colorimetric measurement order, a colorimetric measurement condition for each chart for when colorimetrically measuring using a measurement device, the colorimetric measurement condition being registered in advance;

performing control to cause the measurement device to sequentially colorimetrically measure the plurality of charts while switching the colorimetric measurement condition for each chart according to the colorimetric measurement condition obtained in the obtaining; and registering a target color value for the printing apparatus from a colorimetrically measured value of each one of the plurality of charts in the performing control.

* * * * *